United States Patent [19]

Smith et al.

[11] Patent Number: 5,107,443
[45] Date of Patent: Apr. 21, 1992

[54] PRIVATE REGIONS WITHIN A SHARED WORKSPACE

[75] Inventors: Randall B. Smith, Cupertino, Calif.; Carl A. Waldspurger, Norristown, Pa.

[73] Assignee: Xerox Corporation, Stamford, Conn.

[21] Appl. No.: 241,525

[22] Filed: Sep. 7, 1988

[51] Int. Cl.$^5$ .............................................. G06F 3/14
[52] U.S. Cl. .................................................. 395/158;
[58] Field of Search ............... 364/419, 200 MS File, 364/521; 358/85, 86; 379/53, 54; 380/3, 4, 5, 59

[56] References Cited

U.S. PATENT DOCUMENTS

| | | | |
|---|---|---|---|
| 4,414,621 | 11/1983 | Bown | 364/200 |
| 4,654,483 | 3/1987 | Imai | 379/54 |
| 4,686,698 | 8/1987 | Tompkins | 379/53 |
| 4,853,843 | 8/1989 | Ecklund | 364/200 |
| 4,881,179 | 11/1989 | Vincent | 364/518 |
| 4,905,168 | 2/1990 | McCarthy et al. | 364/521 |
| 4,962,475 | 10/1990 | Hernandez et al. | 364/900 |
| 4,974,173 | 11/1990 | Stefik et al. | 364/521 |
| 4,982,344 | 1/1991 | Jordan | 364/521 |
| 4,987,492 | 1/1991 | Stults et al. | 358/181 |
| 5,008,853 | 4/1991 | Bly et al. | 364/900 |

OTHER PUBLICATIONS

*Computer Communication Review*, vol. 16, No. 3, Aguilar et al., "Architecture for a multimedia teleconferencing system", 1986, pp. 126–136 (abstract only).
NTIS Accession No. AD-A188 352/9/XAB, Abdel-Wahab et al., "Prototype for Remotely Shared Textural Workspaces", 1987, 26 pages (abstract only).
Fairchild, K. M., Poltrock, S. E., and Furnas, G. W., "SemNet: Three-Dimensional Graphic Representations of Large Knowledge Bases," in Guindon, R., Ed., Cognitive Science and its Application for Human Computer Interaction, Lawrence Erlbaum, Hillsdale, New Jersey, 1988, pp. 201–233.
Lewis, Brian T., Hodges, Jeffrey D., "Shared Books: Collaborative Publication Management for an Office Information System", *ACM Conference on Office Information Systems*, Mar. 23–25, 1988, pp. 197–204.
Stefik, M., Bobrow, D. G., Foster, G., Lanning, S., and Tatar, D., "WYSIWIS Revised: Early Experiences with Multiuser Interfaces", *ACM Transactions on Office Information Systems*, vol. 5, No. 2 (Apr. 1987), pp. 147–167.
Foster, Gregg, *Collaborative Systems and Multi-user Interfaces*, Ph.D. Thesis, University of California, Computer Science Division, Report No. CSD/UCB 86/326, 1986, pp. 33–68, 87–90 and 121–132.

(List continued on next page.)

*Primary Examiner*—Dale M. Shaw
*Assistant Examiner*—David Huntley
*Attorney, Agent, or Firm*—James T. Beran

[57] ABSTRACT

In a shared navigable workspace that is presented at more than one workstation, a region is made private in response to a user request. The user can also indicate the region's level of privacy by indicating levels of access of different users. The private region's contents are displayed only to users that have visual access; a non-informative pattern covers the region's area on the displays of other users. The private region and its contents can be modified only by a user with access to modify. When a user requests movement of a pointer into the private region, the pointer can be presented in the private region if the user has sufficient access; otherwise, the pointer would be kept outside the private region's boundary. If a user requests a transition into the private region by selecting a selectable transition unit, called a teleporter, the request would be denied unless the user has sufficient access. The pointer can operate according to a physical metaphor in which it picks up, holds, and puts down other objects, and the user can be permitted to move an object into the private region or to pick up an object within the private region only if the user has sufficient access. Within such a metaphor, a key display object held by a user's pointer can indicate that the user has sufficient access to move the pointer into a corresponding private region; if the user's pointer is not holding the key, it cannot move into the private region.

23 Claims, 14 Drawing Sheets

OTHER PUBLICATIONS

Trigg, R. H., Suchman, L. A., Halasz, F. G., "Supporting Collaboration in Notecards", *Proceedings of the Conference on Computer-Supported Cooperative Work*, Austin, Texas, Dec. 3-5, 1986, pp. 153-162.

Garrett, L. N., Smith, K. E., Meyrowitz, N., "Intermedia: Issues, Strategies, and Tactics in the Design of a Hypermedia Document System", *Proceedings CSCW*, 1986, pp. 163-174.

Sarin, S., Greif, I., "Computer-Based Real-Time Conferencing Systems", *Computer*, Oct. 1985, pp. 33-45.

Fisher, S. S., McGreevy, M., Humphries, J., Robinett, W., "Virtual Environment Display System", *ACM Interactive 3D Graphics*, Oct., 1986, 1-11.

Bolt, Richard A., *The Human Interface*, Lifetime Learning Publication, Belmont, Calif., 1984, pp. 8-34.

Herot, C. F., "Spatial Management of Data", *ACM Transactions on Database Systems*, vol. 5, No. 4, Dec. 1980, pp. 493-514.

Henderson, Jr., D. A., Card, S. K., "Rooms: The Use of Multiple Virtual Workspaces to Reduce Space Contention in a Window-Based Graphical User Interface", *ACM Transactions on Graphics*, vol. 5, No. 3, Jul. 1986, pp. 211-243.

Smith, Randall B., "The Alternate Reality Kit", *IEEE Computer Society Workshop on Visual Languages*, Jun. 25-27, 1986, pp. 99-106.

Wilson, K. S., *Palenque: An Interactive Multimedia Optical Disc Prototype for Children*, Bank Street College of Education Center for Children and Technology, Working Paper No. 2, Mar. 1987.

Halasz, F. G., "Reflections on NoteCards: Seven Issues for the Next Generation of Hypermedia Systems", *Hypertext '87 Papers*, Nov. 13-15, 1987, Chapel Hill, North Carolina, pp. 345-365.

PRIVATE REGIONS WITHIN A SHARED WORKSPACE

BACKGROUND OF THE INVENTION

The present invention relates to graphical user interface techniques for multiple users. More specifically, the invention relates to privacy within a shared workspace.

A number of techniques have been proposed for enabling multiple users to work together through a data processing system.

Stefik, M., Bobrow, D. G., Foster, G., Lanning, S., and Tatar, D., "WYSIWIS Revised: Early Experiences with Multiuser Interfaces," *ACM Transactions on Office Information Systems*, Vol. 5, No. 2 (April 1987), pp. 147-167, described multiuser interfaces that provide users with simultaneous, shared access to a database. Pages 149 and 158 described how such an interface may include both public or multiuser windows and private or single-user windows. The section beginning on page 152 deals with various relaxations of strict WYSIWIS ("what you see is what I see"—each user sees the same thing). Some WYSIWIS relaxations introduce privacy into public windows. Page 161 describes how certain display regions can be used primarily for the placement of private windows and how a density map can be used to show where private windows tend to be located without revealing their contents. Foster, G., *Collaborative Systems and Multi-user Interfaces*, Ph.D. Thesis, University of California, Computer Science Division, Report No. CSD/UCB 86/326, 1986, pp. 33-68, 87-90, and 121-132, discusses multi-user interfaces. Pages 36, in discussing time and space tradeoffs, mentions that an approach to the screen space problem is to allow private views of shared data. Pages 44-47 discuss WYSIWIS relaxations that permit private views of public objects, as well as private objects. FIG. 3.9 illustrates individual views of a shared model. Pages 87-89 describe busy signals to help avoid conflict between participants. As shown in FIG. 4.9, a busy item is greyed out in all views when being edited, moved, or grouped, warning other participants of the work in progress. Pages 121-132 discuss database management techniques to avoid conflict.

Trigg, R. H., Suchman, L. A., and Halasz, F. G., "Supporting Callaboration in NotesCards," *Proceedings of the Conference on Computer-Supported Cooperative Work*, Austin, Tex., Dec. 3-5 1986, pp. 153-162, described collaboration in a hypertext-based idea structuring system identified by the trademark NoteCards, a trademark of Xerox Corporation. Pages 155 describes basic features of the system, in which multiple cards can be simultaneously displayed on a screen, each card in a separate window. Pages 158-159 described simultaneous sharing of a notefile containing a number of cards, contrasting it with draft-passing and pointing out that real-time communication requires special mechanisms. In Distributed NoteCards, any number of users can simultaneously read and display a given card, but permission to modify the card is restricted to one user at a time. Garrett, L. N. Smith, K. E., and Meyrrowitz, N., "Intermedia: Issues, Strategies, and Tactics in the Design of a Hypermedia Document System," *Proceedings of the Conference on Computer-Supported Cooperative Work*, Austin, Tex., Dec. 3-5, 1986, pp. 163-174, describe Intermedia, a framework and collection of tools that allows authors to link together the contents of documents over a workstation network. Pages 171-173 describe a multi-user environment in which multiple authors would have simultaneous access to documents. Section 5.1 discusses accesses control to allow individuals working together to have full access to their shared data, while preventing those without permission from viewing or modifying such data. Read access allows the user to examine the content of a document and follow links; annotate access further allows the user to add links and modify the added links, but not to alter the content of the document; write access further allows the user to modify the content of the document. Similar access rights could apply to a web of documents. If contention management permits multiple writers, complex chalk-passing and synchronization protocols are required.

Sarin, S. and Greif, I., "Computer-Based Real-Time Conferencing Systems," *Computer*, October 1985, pp. 33-45, discuss a number of features or real-time conferencing systems. Page 33 draws a distinction between a shared space of each screen in which each participant sees the same information and private spaces on the screens that allow a participants to view relevant private data or compose and review information before submitting it to the shared space. FIG. 1, as described at page 35, illustrates shared and private spaces. Pages 37-39 discuss a number of design issues, including shared versus individual views, access control, and concurrency control. Under shared versus individual views, Sarin and Grief note that conference participants may want to view different parts of a large shared space, such as different documents or drawings, or different sections of a large document. Under concurrency control, they note that problems can be avoided by allowing only one participant at a time to update the shared space, which can be generalized by having participants set reservations on different parts of the shared space.

Fisher, S. S., McGrreevy, M., Humphries, J., and Robinett, W., "Virtual Environment Display System," presented at ACM Workshop on Interactive 3D Graphics, Chapel Hill, N.C., October 1986, describe a head-mounted, wide-angle, stereoscopic display system controlled by operation position, voice and gesture. This system provides a virtual environment, illustrated in FIG. 3, and FIG. 6 shows a virtual environment workstation. FIG. 9 illustrates how a three-dimensional graphic database of an articulated hand that, in the display environment, is spatially correspondent with the viewer's real hand and is directly controlled by an instrument glove device. This allows the operator to pick up and manipulate virtual objects that appear in the surrounding virtual environment. Similarly, as illustrated in FIG. 12, the operator can manipulate virtual objects to position, size, and activate multiple windows of information and simulated control panels. Page 9 mentions that one major research issue is definition of interface configurations for shared workspace environments in collaborative systems management.

Bolt, R. A., *The Human Interface*, Lifetime Learning Publications, Belmont, Calif., 1984, pp. 8-34, describes Dataland, a spatial data-management system for use in the Media Room, shown in FIGS. 2-1. FIGS. 2-5 shows how a large screen in the Media Room functions as a magnifying glass onto Dataland, an image of which appears on a smaller worldview monitor. Pages 21-25 describe CCA's system that can provide a set of information spaces with transistion points called ports between the spaces, as illustrated in FIGS. 2-16. One of the design issues discussed at pages 26-28 is the sharing of a Dataland with others users.

Herot, C. F., "Spatial Management of Data," *ACM Transactions on Database Systems*, Vol. 5, No. 4, December 1980, pp. 493-514, describes CCA's system in more detail. Page 494 discusses the simultaneous presentation of a world view, as in FIG. 3, and a detailed view of the data surface, as in FIGS. 4-7. Pages 506 describes a method of accessing videodisk data in which the user can zoom in on a particular icon to see an associated frame of videodisk data or a sequence of videodisk images.

Henderson, D. A., Jr., and Card, S. K., "Rooms: The Use of Multiple Virtual Workspaces to Reduce Space Contention in a Window-Based Graphical User Interface," *ACM Transactions on Graphics*, Vol. 5, No. 3, July 1986, pp. 211-243, describe various solutions to the problem of small computer display screens at pages 212-216. Page 215 discusses several system that provide a large virtual workspace in which the screen is treated as a movable viewport onto the workspace. Page 216 discuses the problem of navigation, or finding the way to information without getting lost, pointing out that systems with large virtual workspaces base much of their navigation on translating and zooming and may provide both global and local views. Pages 216-217 discuss the problem of simultaneous access to separated information, and mention that the same piece of information may be logically associated with more than one part of the workspace. Pages 221-237 discuss the design of a system called Rooms, a trademark of Xerox Corporation. Pages 237-241 discuss specific design issues, including the use of accelerators such as overviews and pop-up means for task switching in a large virtual workspace.

The Maze Wars video game is played by more than one player, with each player seeing two views of a maze. One view is a view of the maze from above, within which each player can see the walls of the entire maze as well as a special display feature representing that player's current position within the maze. The other view is a horizontal view from that player's current position, in which the player can see the surrounding walls and can also see a display feature representing another player's current position, but only if the other player's current position is not obscured by a maze wall.

SUMMARY OF THE INVENTION

The present invention provide private region techniques that are especially useful within a shared workspace. Furthermore, techniques according to the invention are applicable in a navigable shared workspace in which each user can select a part of the workspace for viewing. For example, a private region according to the invention can be provided in a large shared virtual workspace within which each user can view a relatively small part of the workspace.

One aspect of the invention is based on the recognition of a basic problem in presenting a shared workspace at a number of workstation. Because each user can view any part of the workspace, no part of the workspace can be absolutely private, in the sense that it is completely hidden from other users. A user could have an additional, private workspace that is not part of the shared workspace, but if the user wishes to share the contents of the private workspace with other users, a cumbersome operation is typically necessary to transfer the contents into the shared workspace. Also, the user may be required to switch back and forth between working in the shared workspace and a private workspace in order to work in both workspaces. In short, conventional shared workspace techniques do not integrated privacy mechanisms into a shared workspace, but only allow a private workspace in parallel with a shared workspace.

This problem can be solved by treating a region within the shared workspace as private. In other words, even though any usedr can view any part of the shared workspace, a region within the shared workspace is different for different users, being private to some subset of the users. A user can request that such a region be made private. Such a request can be accelerated by presenting a previously created region with a selectable display unit that the user can select to request the region be made private. For example, a region can be defined by a boundary or frame that includes a button or similar display unit that the user can select to request privacy.

A closely related aspect of the invention is based on the recognition of a special problem in implementing privacy within a shared workspace in an object-oriented display system. In such a system, the content shared workspace can include a number of distinct display objects, such as icons, windows, physical objects, and so forth. A user may want to work privately on any one of these objects, but it would be difficult for the user interface designer and bewildering for the novice user if every type of object had a different privacy mechanism. Privacy mechanisms could be automatically inherited by new objects, based on the privacy mechanisms of objects on which they are based, but these inherited privacy mechanisms may not be appropriate or desirable and may encumber the interface to an object.

This problem can be solved with regions that can be made private and that can contain display objects. To make an object temporarily private, the user need only make a region private that contains that object or move the object into a private region, so that it is unnecessary for the object itself to have an independent privacy mechanism. Conversely, to share an object previously made private in this manner, the user need only make public the region that contains the object or move the object out of the region. This solution requires only that the designer provide a privacy mechanism for regions, and that a user learn how to use the privacy mechanism applicable to regions. It is unnecessary to provide special access protection for each new type of object that is created, and new objects will not be encumbered with inherited privacy mechanisms. Furthermore, this privacy mechanism can be applied to any set of objects that can be contained by a region, so that the entire set can be made public or private by making the region public or private.

This solution can be extended to produce a stronger form of privacy that is equivalent to a private display object or a private part of a display object.

This can be done, for example, in a user interface in which the user can modify the position, including the size and shape, of a region, and in which a region can be positioned in fixed relation to another display object, such as by putting region corner markers on top of the other object. To make an object private, the user can position the corners of a private region at the perimeter of the object. To make a part of an object private, the user can position the corners of a private region so that the region includes only the private part.

Another related aspect of the invention is based on the recognition of a special problem in implementing private regions in a system that presents a navigable virtual shared workspace. Such a system allows each user to select a part of the shared workspace for viewing, and various selection techniques could be used to permit a user to navigate within the workspace. But each user may have unique navigation requirements or preferences that differ from those of other users.

This problem can be solved by providing selectable display objects for accelerating navigation within a virtual workspace, conveniently referred to as teleporters. For example, teleporters can be paired so that when a user selects one of a pair of teleporters, the part of the shared workspace around the other of the pair of teleporters is presented on that user's display. Like other display objects, teleporters can be made private using private regions, so that each user can set up a private set of teleporters for navigating within the shared workspace. Even if one of a pair of teleporters is in a public part of the shared workspace, if the other is in a private region, a user without sufficient access to that private region is unable to use the teleporter in the public area to obtain access. These selectable display objects thus allow private navigation in a navigable shared virtual workspace.

Additional aspects of the invention are based on the recognition that different levels of privacy within a shared workspace are desirable in different situations. One level of privacy would limit visual access to a private region to one user. Another level of privacy would permit visual access by more than one user but limit access to modify the private region or its contents to one user. Yet another level of privacy would permit visual access by all users, but would limit access to modify the private region or its contents to a subset of users. A privacy mechanism that does not permit different levels of privacy will have limited usefulness.

This problem can be solved by allowing a user to select an appropriate level of privacy for a private region of a shared workspace. The level of privacy can be defined in part by indicating whether visual access is limited and, if so, to whom it is limited. Then, if visual access is not limited or is limited to a group that includes users at more than one workstation, the level of privacy can be further defined by indicating which users have access to modify the private region or its contents. Here again, a selectable display unit can be provided to accelerate selection of a level of privacy. For example, a display object marking a corner of the region can include one button to select private visual access and another button to select private access to modify.

This problem can further be solved by providing appropriate features to enforce the selected level of privacy. The private region can be presented differently at different workstations, with its contents presented to users who have visual access but not presented to users who do not. The private region can be presented as an area with a boundary such as walls around it, and, to the users who do not have visual access, the area surrounded by the boundary can contain a set of display features that do not indicate the contents of the private region. If a user has visual access but not access to modify, that user may be unable to move a pointer through the boundary into the private region. Or, even if a user is able to move a pointer in, the user may be unable to move an object into the private region and may be unable to use the pointer to select any of the selectable display units in the private region, as would be possible if the user had access to modify. The selectable display units in the private region may include the buttons for selecting the region's level of privacy, so that a user without access to modify cannot change the region's level of privacy. Similarly, the private region's contents may include corner display objects that can be moved to change the region's size or shape, so that a user without access to modify cannot change the size or shape of the private region.

A closely related aspect of the invention is based on the recognition of a special problem for shared workspaces in a graphical user interface based on a manipulation metaphor. In such an interface, physical objects are presented to the user, who can control a pointer to pick up and move the physical objects. In order to integrate privacy into such an interface, it is necessary to provide a graphical analog corresponding to the difference between users at different levels of privacy for a region. A solution to this problem is to provide a special object, referred to as a key object, that is available only to a user at a certain level of privacy for a specific private region and that, when held by that user's pointer, allows that user to move the pointer into the private region and pick up physical objects or perform other manipulations there.

The following description, the drawings and the claims further set forth these and other objects, features and advantages of the invention.

DETAILED DESCRIPTION

A. General Features

Figure 1:
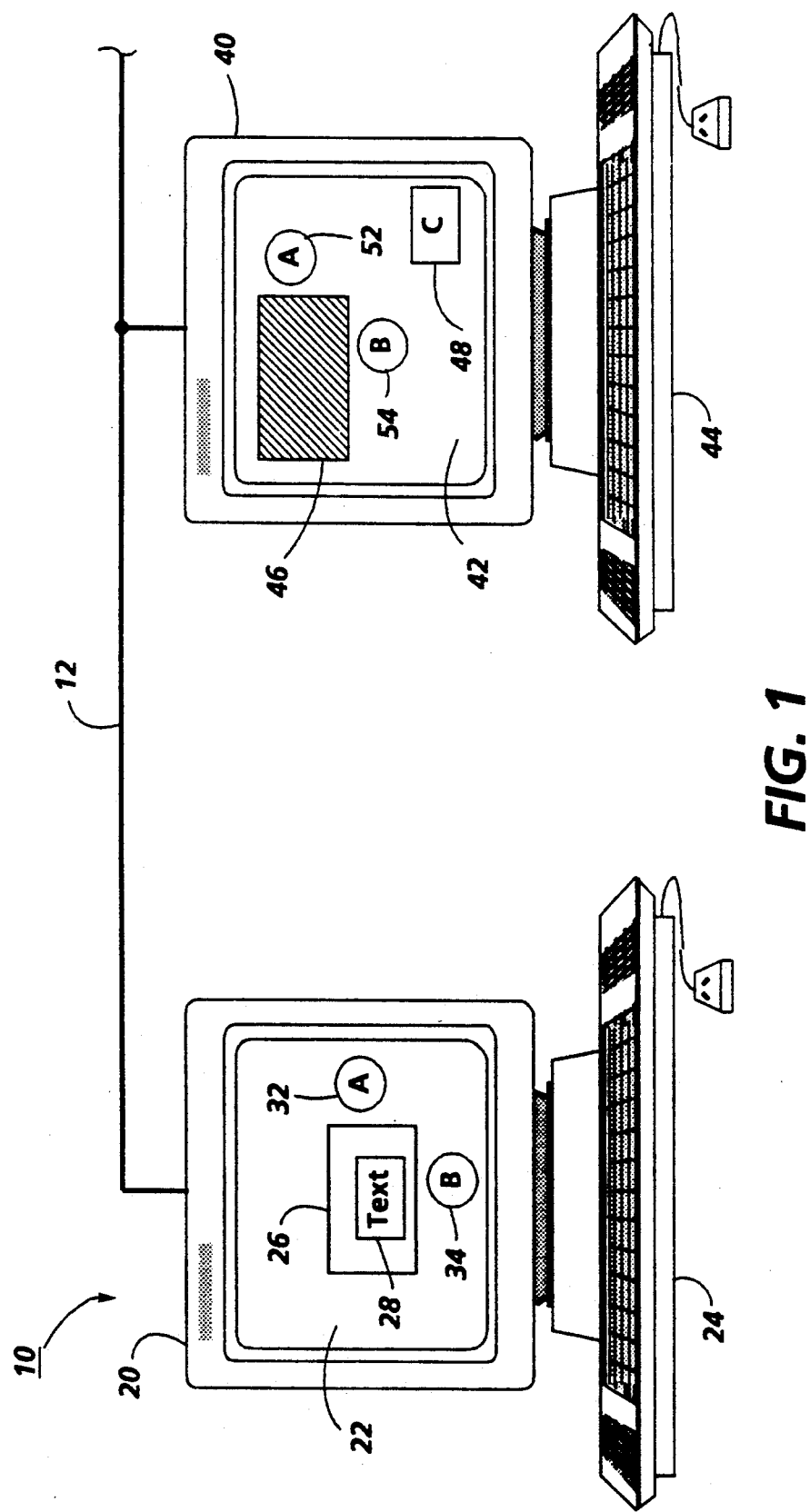
FIG. 1 is a schematic view of two workstations presenting a private region differently according to the invention.
Figure 2:
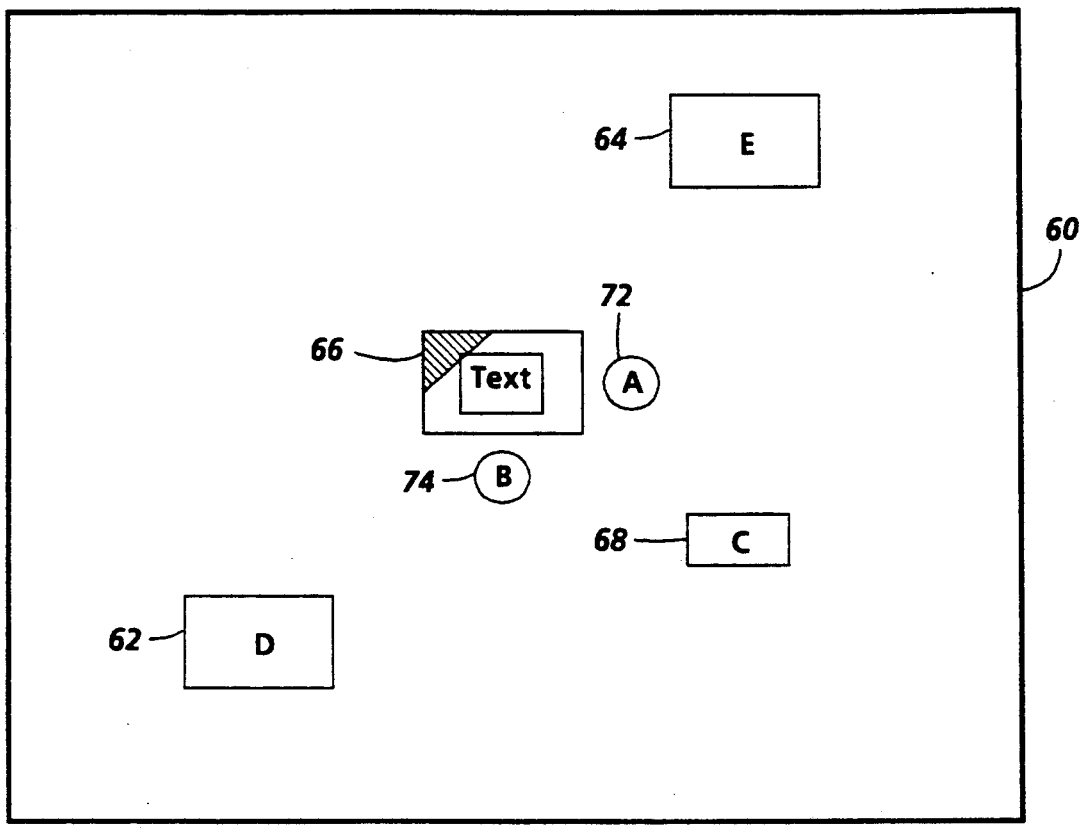
FIG. 2 is a schematic view of a private region within a shared navigable workspace according to the invention.
Figure 3:
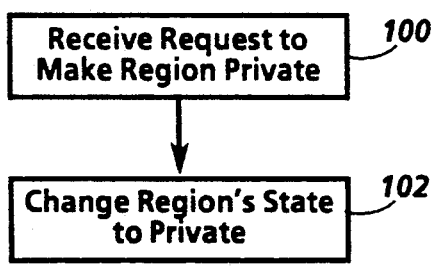
FIG. 3 is a flow chart showing general steps in making a region within a shared workspace private according to the invention.
Figure 4:
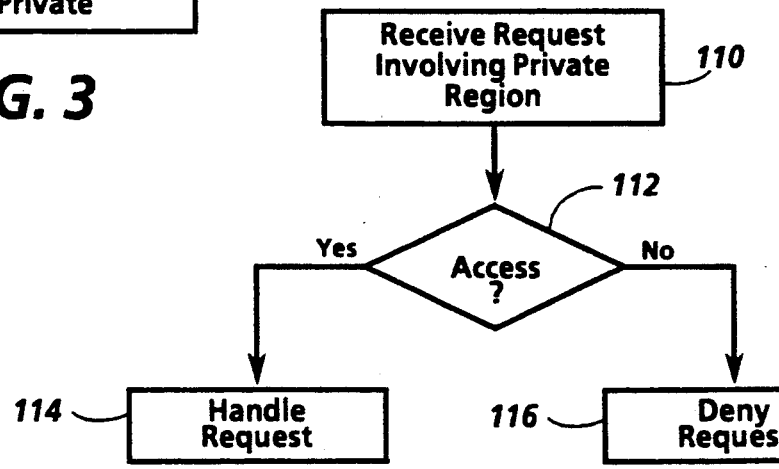
FIG. 4 is a flow chart showing general steps in responding to a request involving a private region within a shared workspace according to the invention.

General features of the invention can be understood from FIGS. 1–4. FIG. 1 shows two workstations of a system, illustrating different presentations of a private region within a shared workspace. FIG. 2 shows a navigable shared workspace that includes the private region presented in FIG. 1. FIG. 3 shows steps in making a region within a shared workspace private. FIG. 4 shows steps in responding to a request involving a private region within a shared workspace.

System 10 in FIG. 1 includes network 12, to which a number of workstations, including workstations 20 and 40, are connected. System 10 is a collaborative system, meaning that it enables users at different workstations to work together in real time. The collaborative functions of system 10 could be centralized in a single main CPU, could be distributed among processors at the workstations, or could be provided in any combination of centralization and distribution. A distributed implementation is discussed in greater detail below. Similarly, network 12 could take any appropriate configuration capable of providing the necessary communications to support collaboration.

System 10 includes display-based user interfaces, with each workstation including a display device and a user input device; workstations 20 and 40 illustratively include respective CRT screens 22 and 42 and keyboards 24 and 44, each with a mouse to provide pointer control signals. System 10 includes a display system that controls each display device, whether a CRT or other device. As shown in FIG. 1, the display system is controlling screen 22 to present a window 26 and, within window 26, a smaller window 28 that illustratively contains text. Near window 26 are icons 32 and 34, labeled "A" and "B" respectively. The display system is similarly controlling screen 42 to present window 46 and window 48, labeled "C", with nearby icons 52 and 54, labeled "A" and "B" respectively.

FIG. 2 illustrates shared workspace 60 that includes features corresponding to those presented by the display system. Workspace 60 includes windows 62, 64, 66 and 68 and icons 72 and 74. Of these, window 68 corresponds to window 48, icons 32 and 52 correspond to icon 72, and icons 34 and 54 correspond to icon 74. Windows 26 and 46 should therefore also correspond to window 66, even though window 26 appears differently than window 46. The area of workspace 60 occupied by window 66 is a private region, illustrated in FIG. 2 by showing part of the contents of window 66 under a non-informative geometric pattern. The contents of window 66 are not visible to a user at workstation 40, but are visible to a user at workstation 20. Therefore, a user at workstation 40, instead of seeing the contents as in window 26, sees a geometric pattern covering all of window 46.

The following conceptual framework is helpful in understanding the broad scope of the invention in relation to display system operations, and the terms defined below have the meanings indicated throughout this application, including the claims. A wide variety of display systems are available including, for example, various graphical user interfaces, but, despite their diversity, these systems tend to have certain common characteristics. One fundamental common characteristic is that a display produces human perceptions. In this application, the term "display feature" refers to any human perception produced at least in part by a display.

Display features may be classified into a number of general categories. A "static display feature," for example, is a feature that can be perceived by a user viewing a static display presentation. A "dynamic display feature," on the other hand, is a feature that can be perceived by a user viewing a changing display presentation, and is typically produced by a sequence of static display presentations. A "context-dependent display feature" is a feature that is perceptible to a user who views a display presentation while simultaneously aware of a context that affects the perception produced by the display; a context-dependent display feature can be produced by a static display feature or a dynamic display feature in appropriate circumstances.

A conceptual framework that forms a basis for understanding several more specific types of display features is set forth in the following copending, coassigned U.S. patent applications: Ser. No. 030,766, entitled "User Interface with Multiple Workspaces for Sharing Display System Objects," filed Mar. 25, 1987 ("the multiple workspace application"); Ser. No. 127,997, entitled "Multiple Shared Virtual Workspaces," filed Dec. 2, 1987 ("the shared workspace application"); and Ser. No. 195,230, entitled "Accelerating Link Creation," filed May 18, 1988 ("the link acceleration application"), now issued as U.S. Pat. No. 4,982,344. The multiple workspace application, the shared workspace application, and the link acceleration application are all incorporated herein by reference. The conceptual framework set forth in those applications can be modified and extended as set forth below.

Frequently, a display system presents a number of visually distinguishable static display features within its static display presentations, and some of these static display features, called "display units," are perceived as persisting through a sequence of one or more static display presentations. A useful type of display unit for understanding this invention is a "display object," although the invention is not limited to systems that present display objects. As used herein, the term "display object" means a display unit or set of display units that is coherent, in the sense of sticking together in a display. Examples of display objects include windows 26, 28, 46 and 48; icons 32, 34, 52 and 54; and characters or other display objects within a window or icon, and so forth.

A "physical display object" is a display object that is recognizable as a physical object, such as a ball, a hand, a switch, and so forth. Although the invention has been implemented with a display system that presents physical display objects, as discussed below, the scope of the invention is not limited to such systems. A physical display object can be used to produce a "moving physical display object" by presenting a sequence of static display presentations in which the physical display object is presented at successive positions, an example of a dynamic display feature.

A "workspace" is a display feature within which other display features appear to have respective positions relative to each other. A workspace can be a display unit with a visible boundary on the display, as windows 26 and 28 illustrate. On the other hand, a workspace need not have a visible outer boundary. The presentation of a workspace produces the human perception of display features in respective relative positions.

A "virtual workspace" is perceived as a workspace that is not completely visible at a given time. Therefore, a virtual workspace is not a static display feature, but could be a dynamic or context-dependent display feature. As shown in FIG. 1, windows 26 and 46 correspond to each other, as do icons 32 and 52 and icons 34 and 54. But a user viewing screen 22 is not able to see a window corresponding to window 48 presented on screen 42. If the presentation on screen 22 shifts to include a window corresponding to window 48, the user is likely to perceive the workspace presented on screen 22 as a partial presentation of virtual workspace 60. Or the user may perceive virtual workspace 60 from past experience of such a shift. Presentation of a virtual workspace produces the human perception of a workspace that exists but is only partially visible or is not always visible.

Presentation of a "shared workspace" produces in a user the perception of seeing the same workspace as another user, a perception that typically includes the perception that one is seeing display features in the same relative positions as the other user. A shared workspace could be a static display feature if information provided within a static display presentation produces this perception. It could also be a dynamic display feature if this perception is produced by observing and recognizing changes that result from another user's perception and modification of the shared workspace. A shared workspace could also be context-dependent: For example, the user may know of the existence of the other user and may perceive display features that can be attributed to the other user; or the user may have an independent communication link to the other user providing information about what the other user can perceive; or the user may recognize a shared workspace from past experience. Workspace 60 is an example of a shared workspace that is also a virtual workspace, and screens 22 and 42 in FIG. 1 show examples of presentation of parts of shared workspace 60. This notion of a shared workspace is a modification and extension of the notion set forth in the shared workspace application.

In real life, a human can have the perception of being in the same space with another human even though each human sees things from a different point of view or has different abilities to modify what is seen. Similarly, a key feature of a shared workspace according to the present invention is that users can perceive a shared workspace even though some of its contents appear differently to different users or even though the system presenting the shared workspace responds differently to requests from different users. For example, even though window 26 appears differently than window 46, a user viewing screen 22 can have the perception of seeing display features in the same relative positions as a user viewing screen 42, and vice versa.

A "region" within a workspace is a part of the workspace that has perceptible extension. Therefore, a region may itself be capable of being a workspace within which display features have relative positions. For example, in a two-dimensional workspace, a region can be a two-dimensional area. In a three-dimensional workspace, a region can be three-dimensional. A region need not, however, have any properties other than its extent. For example, a region need not have any properties that prevent objects from being as easily placed inside or outside the region. On the other hand, a region can have such properties: A conventional window, for example, is a specialized region that typically contains objects that cannot appear except in a window. In general, the regions discussed below in relation to the invention are not windows, but the general notion of a region covers windows and any other type of region.

A region in a shared workspace is "private" when its state within the system presenting the shared workspace is such that the system can present the region so that it is perceived differently by different users at different workstations or can respond differently to requests involving the region from different users or different workstations. Similarly, a region in a shared workspace has a "level of privacy" when the system presenting the shared workspace includes data indicating that any of the wide variety of possible differences between perceptions of a private region or between responses to requests involving a private region are applicable to different users or workstations with respect to that region.

The "access" that a user or workstation has to a private region is determined by the region's level of privacy as it applies to that user or workstation. A user or workstation has "sufficient access" with respect to a requested operation when that user's or workstation's access permits the system to handle a request from the user or workstation for that operation.

If the level of privacy of a region indicates a difference in perception by different subsets of users, the system can produce that difference by presenting the private region with a different appearance to the different subsets of users. For example, the private region can have contents that are presented to one subset of users but are not presented to another subset of users who therefore cannot perceive the private region's contents. In this case, we say that the first subset of users has "visual access" to the private region, while the second does not.

If the level of privacy of a region indicates a difference in response to requests from different subsets of users, the system can produced that difference by handling requests involving the region from one subset of users while denying such requests from another subset of users. For example, requests to modify the contents of the private region could be handled only for the first subset of users, with other users unable to select display objects in the private region, to move objects in or out of the private region, to change the state of the private region to make it non-private, or to change the size or shape of the private region. In this case, we say that the first subset of users have "access to modify" the private region or its contents, while the others do not have access to modify even though they may have visual access.

A "selectable unit" is a display unit that a user can select. The term "select," when used in relation to a selectable unit, means a user input operation that includes a signal that uniquely identifies the selectable unit and requests that it be selected. The user can, for example, use a pointing device such as a mouse to select a selectable unit by indicating its position and clicking a button on the pointing device.

A "navigable workspace" is a virtual workspace in which a user can determine the part that is presented. Presentation of part of a navigable workspace in response to a user input operation can produce the perception of controlling movement within a workspace. A signal based on the user input operation indicates a part of the navigable workspace to be displayed.

A "selectable transition unit" is a display unit within a navigable workspace that the user can select to change the part of the workspace that is presented.

Applying this framework to FIGS. 1 and 2, workspace 60 is a shared virtual workspace that includes a private region, window 66. A user viewing screen 22 has visual access to the private region's contents, in window 26, but a user viewing screen 24 does not. Instead, a user viewing screen 24 sees window 46, with the contents concealed by a geometric pattern.

FIG. 3 shows general steps in making a region within a shared workspace private. A system such as system 10 in FIG. 1 presents the shared workspace to a plurality of users, and the steps shown in FIG. 3 are a part of presenting the shared workspace. The step of presenting the shared workspace can be performed by any technique sufficient to produce the perception of a shared workspace in the users, whether with a static display feature, a dynamic display feature, a context-dependent display feature, or any other technique.

In box 100, the system receives a signal from one of the users viewing the shared workspace requesting that a region within the shared workspace be made private. The user could, for example, perform an input operation to provide a signal requesting privacy for a region. The input operation could take any appropriate form. For example, the user could obtain a menu or other group of selectable units and select an appropriate one of the units. Or the user could select an appropriate currently displayed selectable unit. Or the user could type and enter an appropriate command through the keyboard. As a part of the input operation, the user could indicate the region to be made private, by making a selection unique to that region or by indicating the bounds or other definition of the region. The user could also indicate a requested level of privacy for the region, or could indicate different levels of privacy applicable to different sets of users.

In response to the request received in box 100, the system performs appropriate operations in box 102 to change the state of the region such that it is private. In other words, the system stores or modifies data relating to the region such that the system can thereafter present the region so that it is perceived differently by different users or can thereafter respond differently to requests involving the region from different users. For example, the system may thereafter conceal the contents of the region from users that do not have visual access, by presenting a geometric pattern or other noninformative display features in the private region on the displays viewed by those users. The system may, on the other hand, present the contents of the region to each user that has visual access.

FIG. 4 shows general steps the system could follow in responding differently to requests involving a private region from different users, not all of whom have sufficient access to support the request. As in FIG. 3, the steps in FIG. 4 are included in the broad step of presenting a shared workspace that includes the private region.

In box 110, the system presenting the shared workspace receives a request involving the private region. This request could take a variety of forms. For example, one of the users viewing the private region could move a pointer into the private region and could provide a signal to select or otherwise operate on a selectable unit in the private region. Or a user could attempt to modify the contents of the region, such as by moving or copying a pointer or other display object into the private region from outside its boundaries or by removing a pointer or other display object from the private region. Or the user could attempt to select or otherwise operate on the region itself, such as by changing its position, including size or shape, or by changing its state, such as its level of privacy, perhaps returning it to a state in which it is not private. Any of these requests would involve the private region.

In box 112, the system determines whether the requesting user has sufficient access to support the request received in box 110. The system could make this determination based on previously stored data indicating what is sufficient access for each request and also based on data indicating what access the requesting user has with respect to the particular private region involved. The system could, for example, have a level of privacy such as access to modify that permits any request involving a private region, in which case the step in box 112 could simply determine whether the requesting user has access to modify the specific private region involved. On the other hand, the system could have a number of levels of privacy, each permitting a corresponding set of requests, in which case the step in box 112 would be more complicated.

If the step in box 112 determines that the user has sufficient access, the step in box 114 handles the request. If the step in box 112 determines that the user lacks sufficient access, the step in box 116 denies the request. The step in box 116 can if appropriate perform operations to recover from the denied request, such as by moving an object that the user requested be moved back to its previous location or to a location just outside the private region. It may also be appropriate to provide a message to the user indicating why the request was denied.

We turn now to consider in greater detail how these general features can be implemented.

B. Smalltalk Implementation

The invention could be implemented in a wide variety of ways. The invention has currently been implemented using a Smalltalk-80 system, which is especially suited to rapid prototyping of graphical user interfaces. Smalltalk-80 is a trademark of ParcPlace Systems, Inc.

Smalltalk-80 system features are described in detail in Goldberg, A. and Robson, D., *Smalltalk-80: The Language and its Implementation*, Addison-Wesley, Reading, Mass., 1983; Goldberg, A., *Smalltalk-80: The Interactive Programming Environment*, Addison-Wesley, Reading Mass., 1984; and *The Smalltalk-80 Programming System, Version* 2.3, ParcPlace Systems, Inc., Palo Alto, Cal., 1988, available for each of a number of workstations ("the Smalltalk-80 books"). As explained in the Smalltalk-80 books, a Smalltalk-80 system for a given workstation includes a Smalltalk-80 virtual machine for that workstation, currently available from a number of workstation manufacturers for their products, and Smalltalk-80 Virtual Image, a software product of ParcPlace Systems, Inc. that includes a number of features in addition to those described in the Smalltalk-80 books. As described below, the invention could be implemented on such a Smalltalk-80 system running on a number of workstations connected by a network that provides appropriate support.

The Smalltalk-80 system is object-oriented, meaning that, at a certain level, all data is organized into objects and messages to objects, sometimes referred to herein as "system objects" to distinguish them from display objects. Each object is an instance of a class that includes, for each message an instance of that class can handle, information defining a response, also called a method. Each class may also include instance variable names, and each instance of a class may assign to one of the instance variables of that class a pointer to another object. Instance variables can be referred to in methods. To create a new class as a subclass of an existing class, one indicates the superclass, i.e. the existing class from which the new class is descended; names any instance variables in addition to those the subclass inherits from the superclass; and provides Smalltalk-80 code for each method that is either different from that inherited from the superclass or is additional to those so inherited. Once a class has been created, an instance of that class can be created by sending the message "new" to the class.

The Smalltalk-80 system supports an object-based user interface, in which display objects correspond to system objects. A user can perform actions to request that a message be sent to a given display object, and the result is that the message is sent to the corresponding system object. One implementation described below builds on a Smalltalk-80-based user interface known as ARK, which presents physical objects and provides a manipulation metaphor under which the user controls a pointer shaped like a hand to pick up and move the physical objects. ARK is described in Smith, R., "The Alternate Reality Kit: An Animated Environment for Creating Interactive Simulations," 1986 *IEEE Computer Society Workshop on Visual Languages*, Jun. 25-27, 1986, Dallas, Tex. pp. 99-106. ("the ARK article"), incorporated herein by reference. The ARK article includes a description of a number of ARK objects, and the system object for each of these objects is implemented as an instance of a class descended from one of the classes in Smalltalk-80.

We will first consider a version of ARK that provides a shared workspace, and then consider a technique that provides private regions within a shared workspace that can be applied to a shared ARK workspace.

1. Shared ARK

Figure 5:
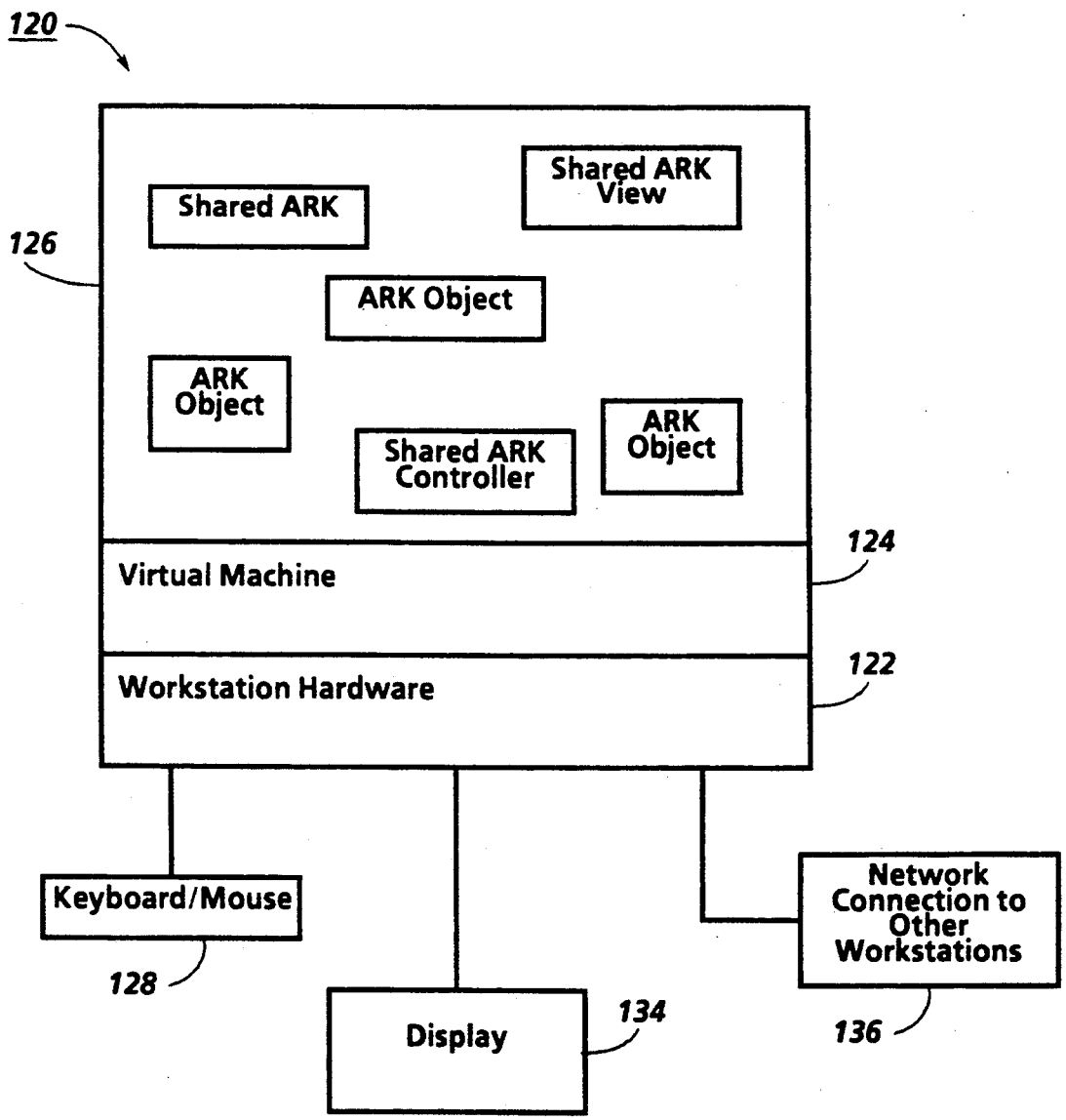
FIG. 5 is a schematic diagram showing components of a workstation presenting a private region within a shared workspace according to the invention.

FIG. 5 shows major functional components of workstation 120, one of a number of connected workstations at which a shared workspace called Shared ARK can be presented. Workstation hardware 122 executes Smalltalk-80 virtual machine software 124, which in turn supports Shared ARK system 126. Shown in Shared ARK system 126 are several exemplary system objects it includes, all of which are supported by virtual machine 124. For example, Shared ARK system 126 includes a model, view, and controller, as described in the Smalltalk-80 books. The model is referred to simply as SharedARK. The view, SharedARKView, provides a display of SharedARK for presentation in a window. The controller, SharedARKController, handles overall control of the window and the running of SharedARK. Shared ARK system 126 also includes other ARK objects, as shown and as discussed in greater detail below, The Smalltalk-80 system includes a conventional input sensor (not shown), an object that gives access to the state of keyboard/mouse 128. In other words, the input sensor maintains a current input state based on interrupts from keyboard/mouse 128.

SharedARKController, like the conventional Smalltalk-80 controller, repeatedly receives a "controlActivity" message and responds to each "controlActivity" message with its corresponding method, which is completed before the next "controlActivity" message is received. SharedARKController, as part of its controlActivity method, sends a "step" message to SharedARK. SharedARK in turn provides messages to ARK objects as described in the ARK article. Each ARK object represents a corresponding physical object, an image of which is presented as a physical display object on display 134. The positions of these physical display objects can change over time, and SharedARK responds to the Step message by sending a "step" message to each ARK object, as discussed in greater detail below. Each ARK object responds according to its own characteristics. For example, motion can be provided by a special ARK object that responds to each "step" message from SharedARK by advancing each of the ARK objects according to its respective velocity. When all ARK objects have responded, SharedARK, like a conventional Smalltalk-80 model, performs an update operation by sending itself the message "changed" which in turn sends a message to SharedARKView requesting it to present the physical display objects in their updated positions on display 134.

During a Shared ARK session, some of the system objects in Shared ARK system 126 communicate with similar objects on other workstations through network connection 136.

We turn now to consider an implementation of private regions in Shared ARK in greater detail.

2. Private Regions

The Smalltalk-80 code in Appendix A provides private regions and could be included in Shared ARK system 126 in FIG. 5. A complete implementation of Shared ARK system 126 could include additional code supporting features not related to private regions. For example, the code in Appendix A provides a pointer display object shaped like an arrow, but this could be replaced by a pointer display object with the appearance of a hand, as described in the ARK article. Similarly, a law of motion could be added to provide moving display objects as described in the ARK article. In general, all system objects could be presented as physical display objects, as described in the ARK article.

Figure 6A:
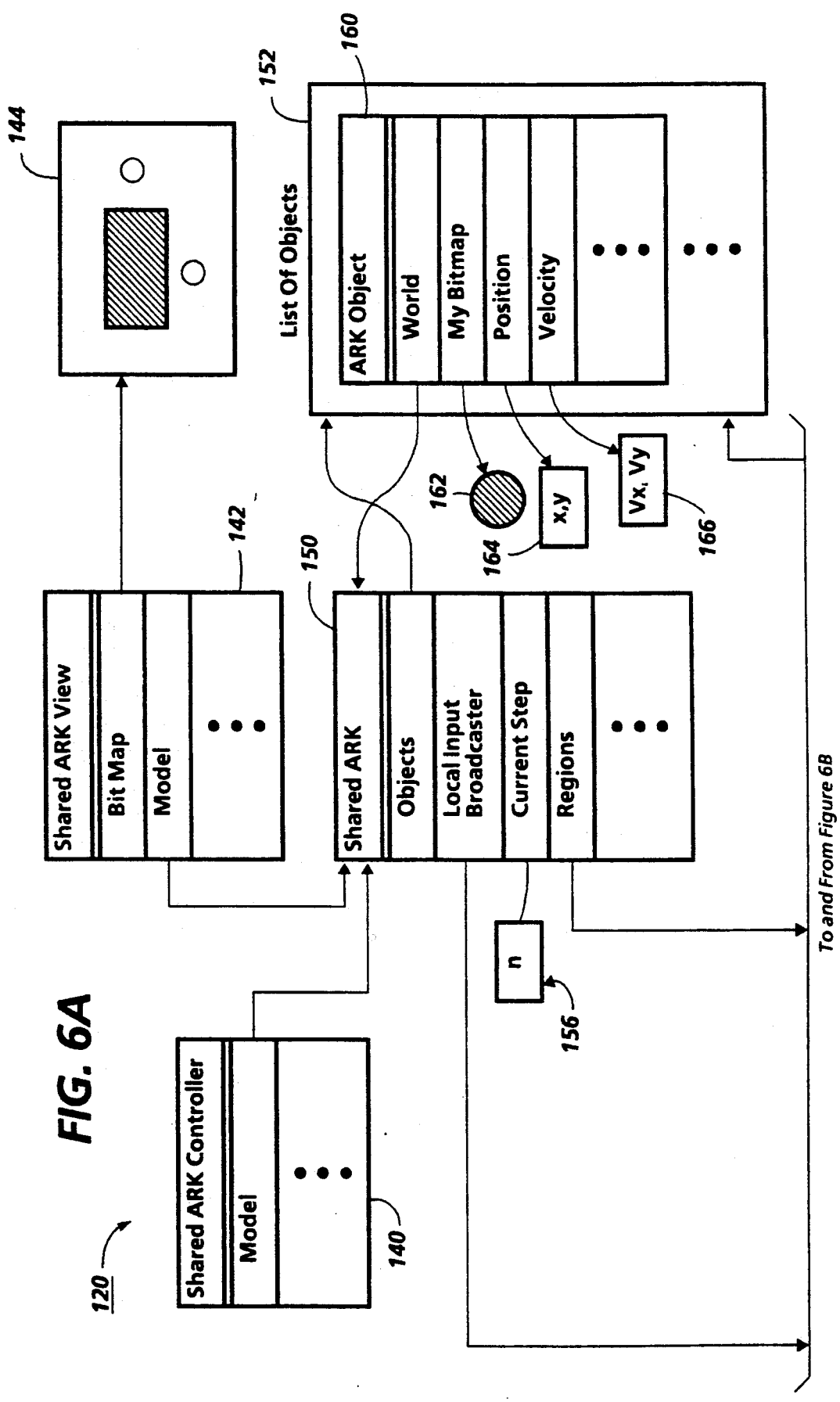
FIGS. 6A and 6B together are a schematic block diagram showing structure and relations between system objects within the Shared Ark system in FIG. 5 that relate to presenting a private region within a shared workspace according to the invention.
Figure 6B:
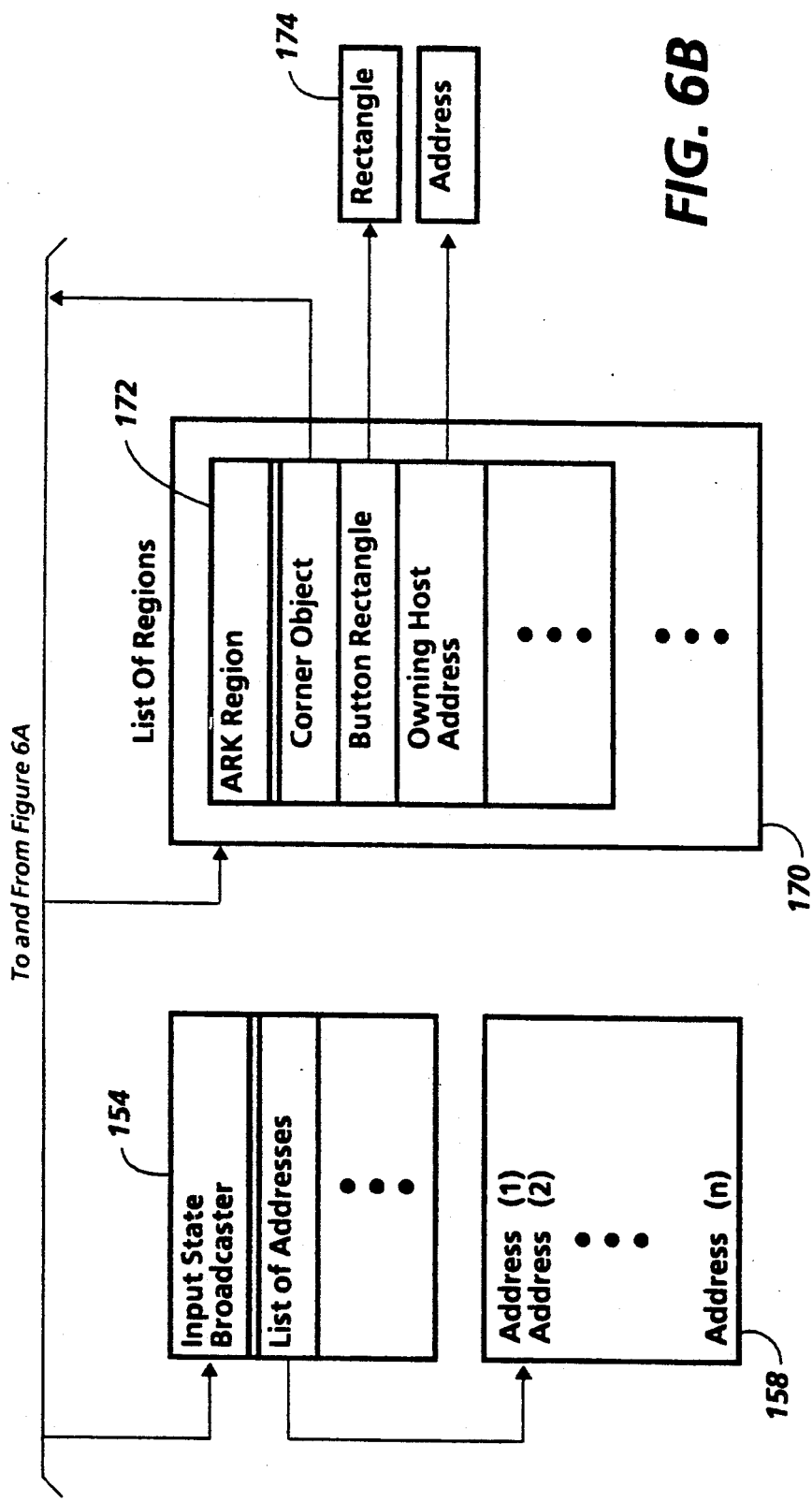
Figure 7:
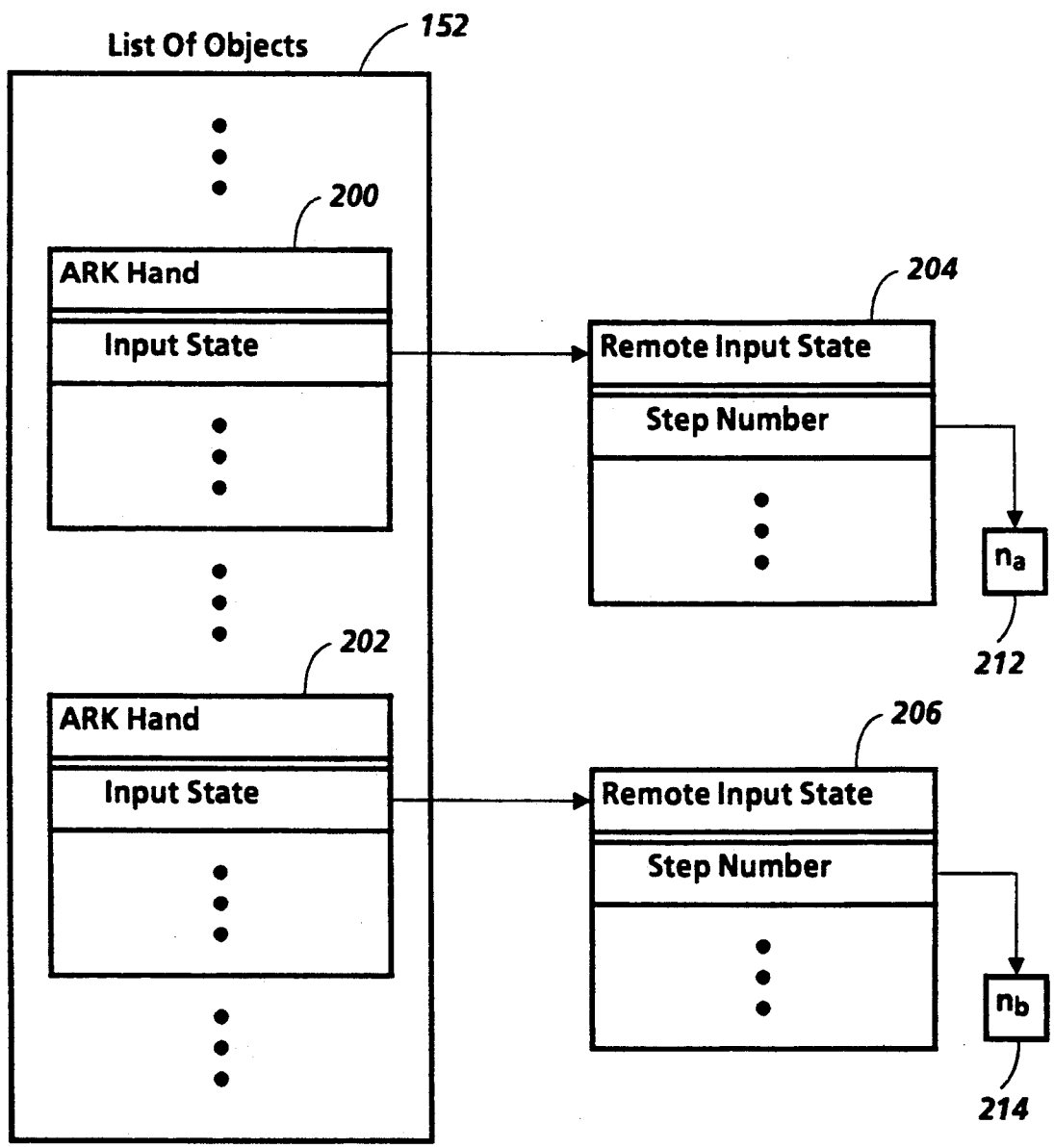
FIG. 7 is a schematic block diagram showing additional structure and relations between system objects within the Shared Ark system in FIG. 5.
Figure 8:
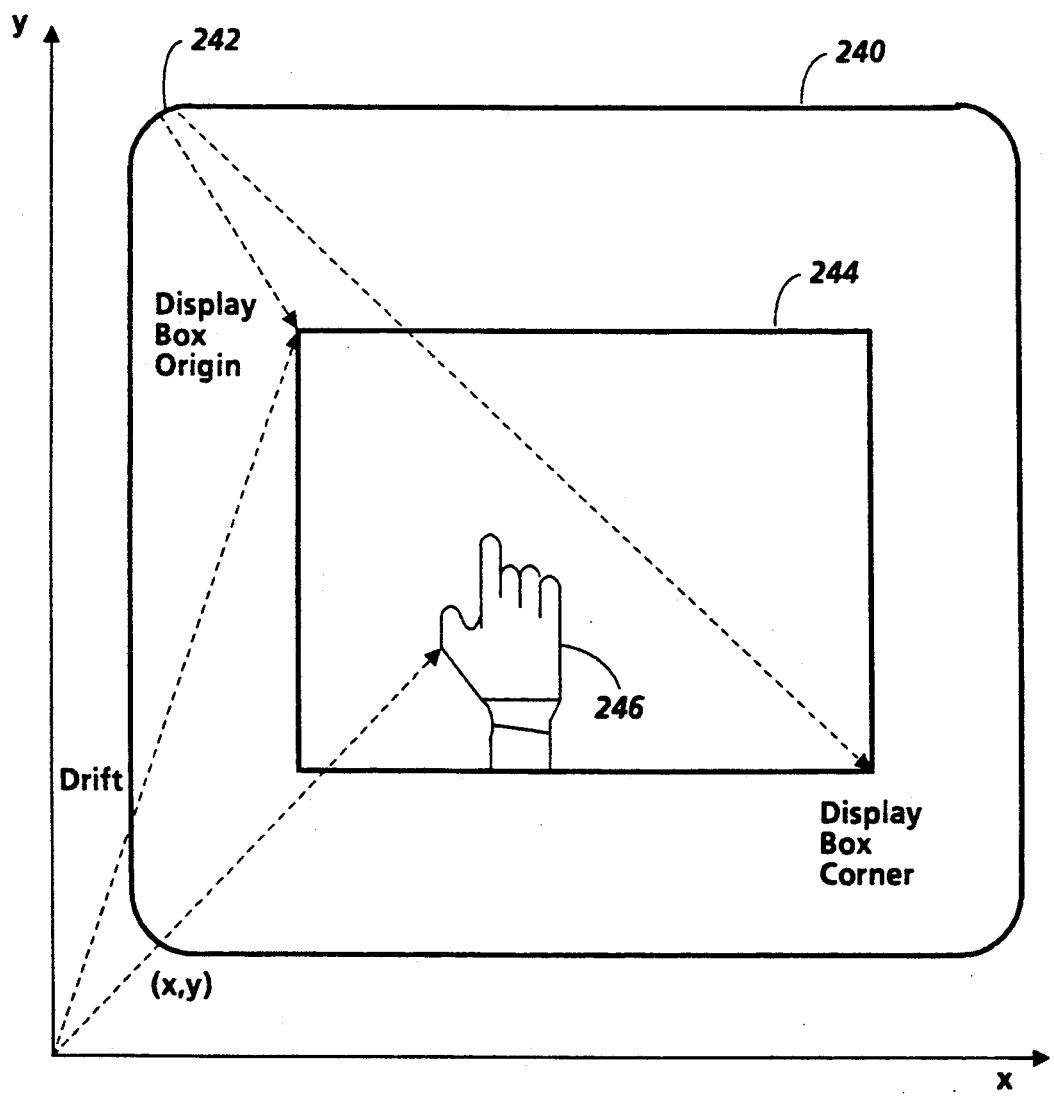
FIG. 8 shows schematically the coordinate system of a shared workspace within which physical display objects are presented.

FIGS. 6A and 6B show the structures of several Shared ARK system objects that are instances of classes defined by the code in Appendix A, including the class ARKRegion. FIGS. 6A and 6B also illustrate the relations between those objects that make it possible to provide private regions within a shared workspace. FIG. 7 shows additional structures and relations of Shared ARK system objects, including those of the system objects that provide communication with other workstations, which is necessary to present a shared workspace. FIG. 8 shows the coordinate system that defines the positions of display objects within the shared workspace. FIGS. 9A, 9B, 10A, and 10B show screen images illustrating the steps by which a region is made private. FIG. 11 illustrates the nesting of regions and of other objects within regions. Screen images like those shown in FIGS. 9A, 9B, 10A, 10B, and 11 could be provided by straightforward enhancements of the implementation of Appendix A.

FIGS. 6A, 6B and 7 together illustrate the structure of an application in Smalltalk-80 that can provide a private region in a shared workspace, exemplified by the code in Appendix A. Each of the system objects in FIGS. 6A, 6B and 7 is an instance of a class that is, in turn, a subclass of a Smalltalk-80 class. Several system objects in the implementation of FIGS. 6 and 7 are instances of new classes and are shown with a class name above a double line and a number of instance variables below the double line, although not all instance variables in Appendix A are shown for each new class. Typically associated with each instance variable in a system object is a pointer to another, corresponding system object that serves as that instance variable for that system object, illustrated in FIGS. 6A, 6B and 7 with an arrow linking the instance variable to the corresponding system object.

In general, any Smalltalk-80 application that provides a window in the Smalltalk-80 overlapping window environment employs the Smalltalk "Model, View, Controller" paradigm mentioned above in relation to FIG. 5. More specifically, the implementation of Appendix A, as illustrated in FIGS. 6A, 6B and 7, includes three new classes, one a controller, one a view, and one a model, as well as other new classes associated with the model.

In FIGS. 6A and 6B, the controller is system object 140, an instance of the new class "SharedARKController," a subclass of Smalltalk-80 class "StandardSystemController." As implemented in Appendix A, this new class has no new instance variables in addition to those it inherits but has several new methods. The most important of those methods, "controlActivity," normally sends the message "step" to the system object to which its instance variable "model" has a pointer. As shown in FIG. 6A, "model" has a pointer to an instance of the class "SharedARK," discussed below.

Similarly, the view in FIG. 6A is system object 142, an instance of the new class "SharedARKView," a subclass of Smalltalk-80 class "StandardSystemView." As implemented in Appendix A, this new class has only one new instance variables in addition to those it inherits, "bitmap," which has an associated pointer to bitmap 144, an instance of Smalltalk-80 class "Form" and the bitmap that is displayed within a Shared ARK window presented on the display of the workstation that includes the objects shown in FIGS. 6A, 6B and 7. Presentation of bitmap 144, if appropriately coordinated with presentation of bitmaps at other workstations, results in presentation of a shared workspace. Presentation of bitmap 144 can provide a shared workspace, for example, if its shows substantially the same physical display objects in substantially the same relative relations as the bitmaps presented at other workstations. In addition, the class "SharedARKView" has several new methods. Some of those methods include steps sending messages to the system object to which its instance variable "model" has a pointer, the same system object to which the controller's "model" points.

FIG. 6A also shows the model, system object 150, an instance of the new class "SharedARK," a subclass of Smalltalk-80 class "Object." As implemented in Appendix A, the class "SharedARK" has several new instance variables and methods.

Two instance variables for SharedARK 150 each have an associated pointer to a list of objects. The instance variable "objects," for example, has a pointer to list 152, which includes a number of system objects that represent physical objects. These system objects therefore correspond to physical display objects presented within bitmap 152 and hence within the shared workspace, including object 160, an instance of the new class "ARKObject," discussed below.

SharedARK 150 has another instance variable "localInputBroadcaster" with a pointer directly to system object 154, an instance of the new class "InputStateBroadcaster," discussed below. SharedARK 150 has another instance variable "currentStep" that has an associated number 156 with the value "n" indicating the current step of SharedARK 150.

System object 154 is an instance of the new class "InputStateBroadcaster" as noted above. "InputStateBroadcaster" is in turn a subclass of a class "RetransmitSocket," which can be more fully understood by reference to Appendix A. The class "RetransmitSocket" is one of a number of support classes that could be created to permit transactions between a system like Shared ARK system 126 and a network interconnecting a set of workstations. Appendix B provides a fuller description of four such support classes, "RetransmitSocket," "PupAddress," "Pup," and "EtherDevice."

Support classes like those described in Appendix B may require different implementations for different network hardware or for different network communication protocols. The descriptions provided in Appendix B are aimed at the use of an Ethernet local area network, using a "PUP" protocol. These descriptions could, however, be easily modified to fit any network or communication protocol. Since different networks and protocols require that some of the details be implemented differently, it is not feasible to provide code suitable for all networks and protocols. Therefore, Appendix B describes the implementation of some methods in words rather than by providing code, with the descriptive words explaining how an implementation would be done in more general terms. Other methods are described by providing exemplary code that could be used to implement them.

To incorporate a network into a Smalltalk-80 environment, two primitive methods are necessary, named "primitiveReceiveInto:signal:" and "primitiveSendPacket:size:", and these two primitive methods are also described in Appendix B. The commercially available Smalltalk-80 product supports user creation of primitive, as explained in *The Smalltalk-80 Programming System, Version* 2.3, ParcPlace Systems, Inc., Palo Alto, Calif., 1988, incorporated herein by reference.

As implemented in Appendix A, the class "InputStateBroadcaster" has a number of new instance variables in addition to those inherits from the class "RetransmitSocket," and also has several new methods. One of those instance variables, "listOfAddresses," has an associated pointer to a list of addresses, illustrated by ListOfAddresses 158 in FIG. 6B. ListOfAddresses 158 includes a network address for each of the workstations participating in a Shared Ark session, so that SharedARK 150 can use InputStateBroadcaster 154 to send messages indicating its current input state to all of those workstations.

System object 160, as noted above, is an instance of the new class "ARKObject," a subclass of the Smalltalk-80 class "Object." As implemented in Appendix A, the class "ARKObject" has a number of new instance variables and several new methods. Each instance of the class "ARKObject" is one of the system objects that corresponds to a physical display object within bitmap 144 and hence within the shared workspace, so that some of its instance variables provide the information necessary for the presentation of that physical display object on the workstation's display.

The instance variable "world" has an associated pointer to SharedARK 150, allowing for communication with SharedArk 150. The instance variable "myBitmap" has an associated pointer to bitmap 162 for the corresponding physical display object. The instance variable "position" has an associated pointer to object 164, an instance of a Smalltalk-80 class that includes x- and y-coordinates, used to determine the display position of the corresponding physical display object. The data associated with instance variables "myBitmap" and "position" is sufficient to define the position and size of the bounding box of the physical display object's bitmap in relation to Bitmap 144. The instance variable "velocity" similarly has an associated pointer to object 166, an instance of a Smalltalk-80 class that similarly includes x- and y-components of the velocity of the corresponding physical display object.

In addition to the instance variables shown in FIGS. 6A and 6B, the class "ARKObject" can include additional instance variables that assist in providing the various features described in the ARK article, including mass, text, and so forth. The instance variables of an instance of class "ARKObject," through the objects to which they are linked, thus provide the necessary data to display the corresponding physical display object at the appropriate position.

FIGS. 6A and 6B also illustrate an instance of a subclass of the new class "ARKObject." One instance variable of SharedARK 150 is "regions," with an associated pointer to list 170, a list of regions within bitmap 144 and hence within the shared workspace. The system object for each region is an instance of the new class "ARKRegion," a subclass of the class "ARKObject," so that each instance of the class "ARKRegion" that is on list 170 is also on list 152. As implemented in Appendix A, the class "ARKRegion" has additional instance variables besides those of the class "ARKObject," and also has several new methods. As shown for ARKRegion 172, the instance variable "cornerObject" has an associated pointer to an instance of the class "ARKObject" which provides a display object at one corner of the region. The instance variable "buttonRectangle" has an associated pointer to system object 174, an instance of the Smalltalk-80 class "Rectangle" which provides a selectable display object within the region that the user can select to toggle the state of privacy of the region. The instance variable "owningHostAddress" can have an associated pointer to a system object that is an instance of a Smalltalk-80 class and that provides one of the network addresses in ListOfAddresses 158.

As implemented in Appendix A, the class "ARKRegion" includes the method "respondToHand: anARKHand," which responds to a message that is provided when one of the users in a Shared ARK session makes a selection signal. This method includes steps corresponding to the general steps shown in FIG. 3, as discussed above if the selection signal is provided when the user's pointer display object is on the selectable display object that toggles the region's state of privacy. If the region is not private, so that its instance variable "owningHostAddress" points to the system object "nil," the method makes the region private as in FIG. 3.

FIG. 7 shows additional system objects and their relations, including system objects 200 and 202, each an instance of a new class "ARKHand" and each on list of objects 152 because the class "ARKHand" is another subclass of the class "ARKObject." As implemented in Appendix A, the class "ARKHand" has an instance variable "inputState" with an associated pointer to an instance of another new class "RemoteInputState." The class "ARKHand" also has a method "setPosition: aPoint" that handles a user request to move into a private region only if the user is the owner, with access to enter the private region. This method determines whether the request can be handled as in FIG. 4, enforcing privacy by denying the request if the requesting user does not have access.

The class "RemoteInputState" is another subclass of the class "RetransmitSocket," discussed above in relation to Appendix B. As implemented in Appendix A, the class "RemoteInputState" has several new instance variables and several new methods. FIG. 7 shows two instances of this class, RemoteInputStates 204 and 206, and these system objects receive signals indicating the input states of respective workstations in a Shared ARK session through the network, one of which is the local workstation. One of the input variables of RemoteInputStates 204 and 206 is "stepNumber," with associated pointers respectively to system objects 212 and 214, each of which keeps track of the current step of the respective workstation, indicated as $n_a$ and $n_b$. The physical display object corresponding to ARKHand 200 is a pointer controlled by mouse movements at the respective workstation of RemoteInputState 204, which could, for example, be the local workstation. The physical display object corresponding to ARKHand 202 is a pointer controlled by mouse movements at the respective workstation of RemoteInputState 206, which could, for example, be a remote workstation.

RemoteInputStates 204 and 206 also include other instance variables (not shown) with pointers to instances of several other Smalltalk-80 classes, including data defining the current x- and y-coordinates of the pointer based on mouse movements; the current button state of the mouse; the current drift of the corresponding bitmap in relation to the Shared ARK coordinate system, described below in relation to FIG. 8; and the current origin and corner of the window within which the bitmap is presented, called the "displayBox," also described in relation to FIG. 8.

As noted above in relation to InputStateBroadcaster 154, list 158 includes a network address for each of the N workstations in a Shared ARK session. Each workstation will also have N instances of the class "RemoteInputState," as exemplified by RemoteInputStates 204 and 206. One of the instances of the class "RemoteInputState" will thus correspond to the same workstation as InputStateBroadcaster 154, as noted above, so that network activity will actually only be employed for N−1 network addresses.

FIG. 8 illustrates a coordinate system that can be used to provide parameters for an instance of either of the classes "InputStateBroadcaster" or "RemoteInputState" in the implementation of Appendix A. The parameters relate to display screen 240 of the corresponding workstation. Display screen 240 has origin 242, arbitrarily shown at its upper left corner. Window 244 is presented on display screen 240, within which is presented the bitmap of the shared workspace from the instance of class "SharedARKView" that controls window 244. Within the bitmap is pointer 246, illustratively in the shape of a hand. As shown, the x- and y-coordinates of pointer 246 are determined from the origin of the coordinate system, so that they are independent of the workstation. The drift of window 244 is similarly determined from the origin of the coordinate system. To position window 244 within screen 240, however, window 244 has a displayBox origin and a displayBox corner, both determined from origin 242. As can be seen in FIG. 8, the drift of window 244 is independent of its displayBox origin and corner, so that window 244 can move within screen 240 without moving in relation to the origin of the coordinate system. In general, only instances of the classes "InputStateBroadcaster," "RemoteInputState," and "SharedARKView" are concerned with the displayBox origin and corner.

Figure 9A:
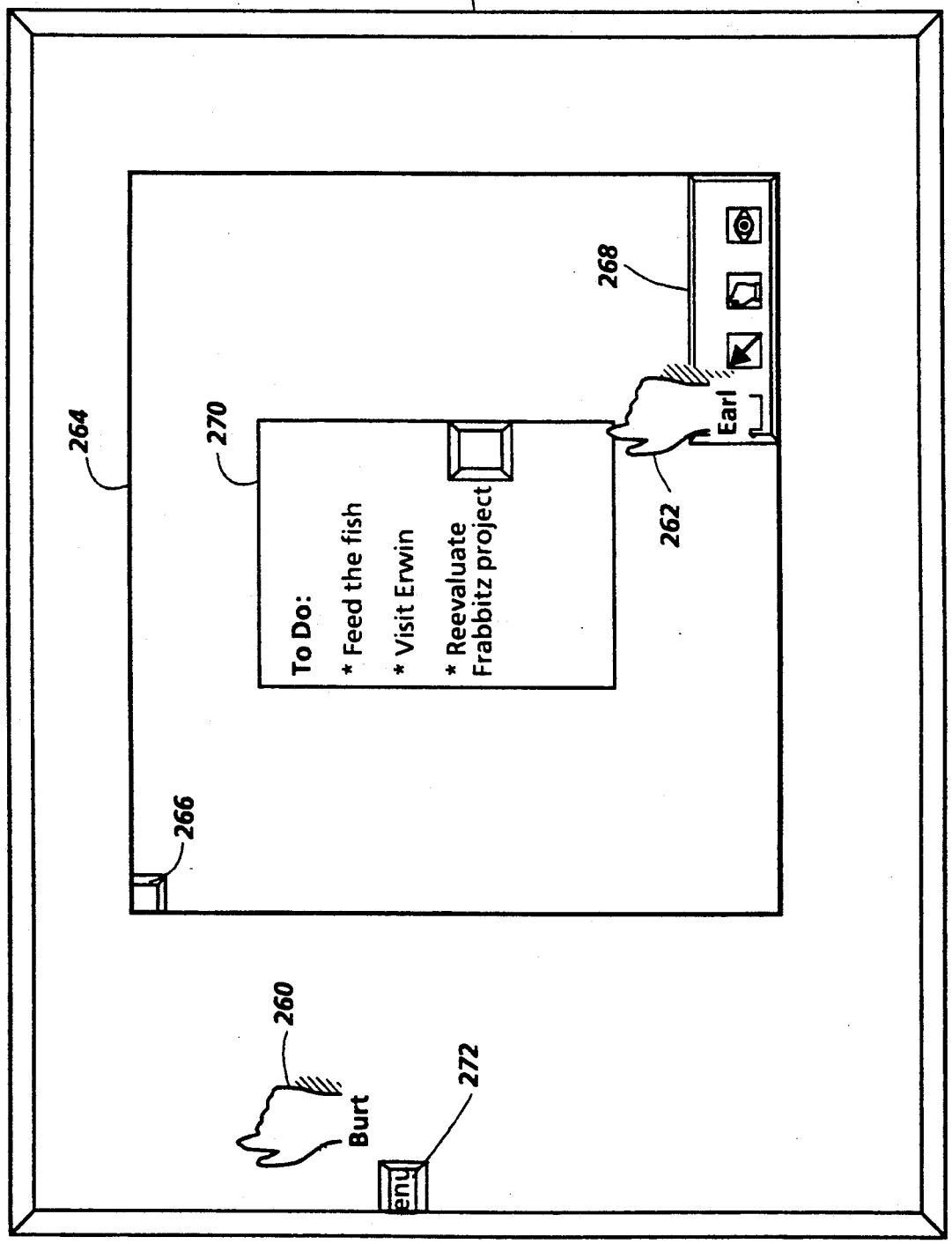
FIGS. 9A and 9B show simulated screen images of two workstations presenting a shared workspace, both showing a region that can be made private according to the invention.
Figure 9B:
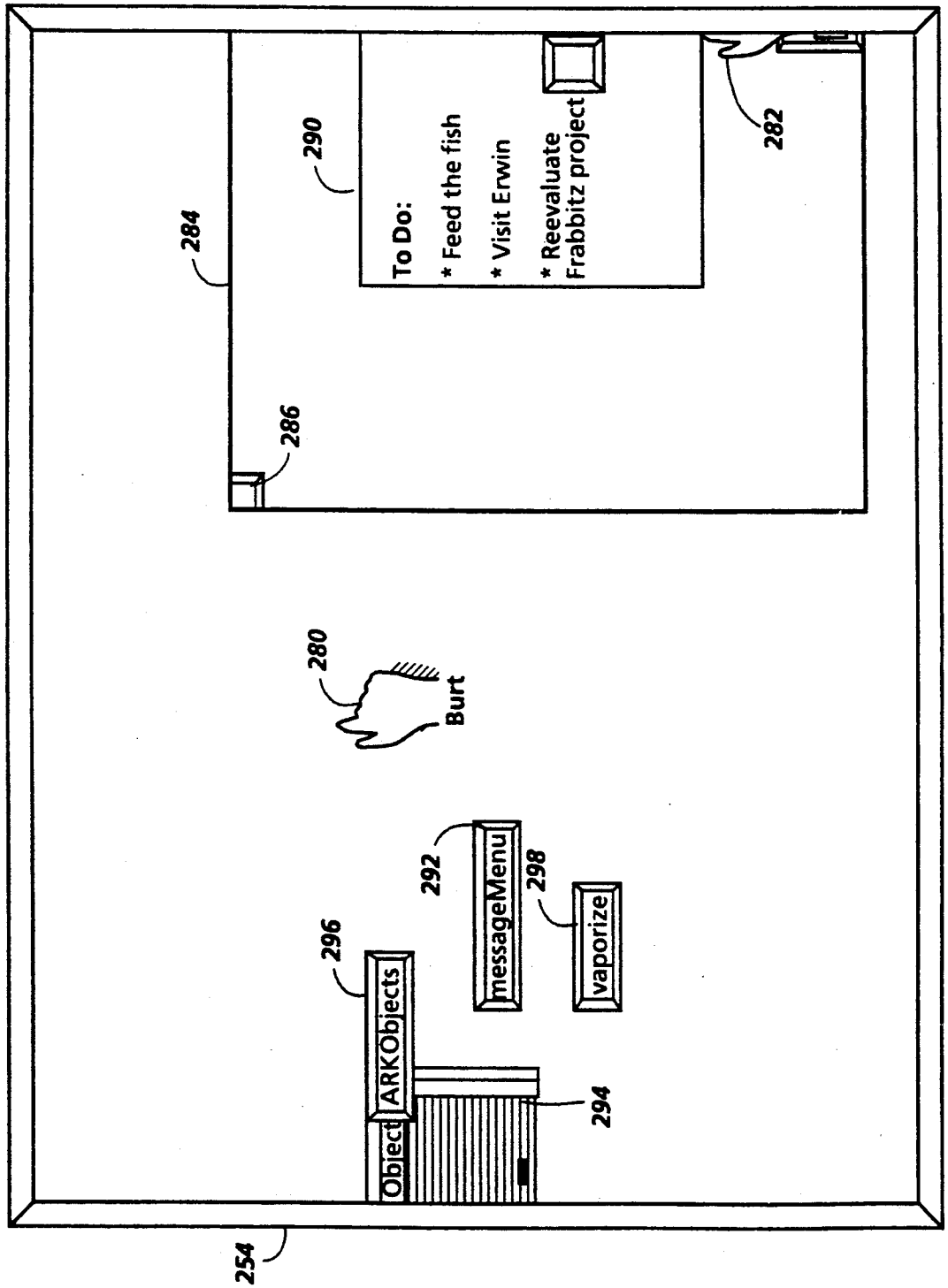
Figure 10A:
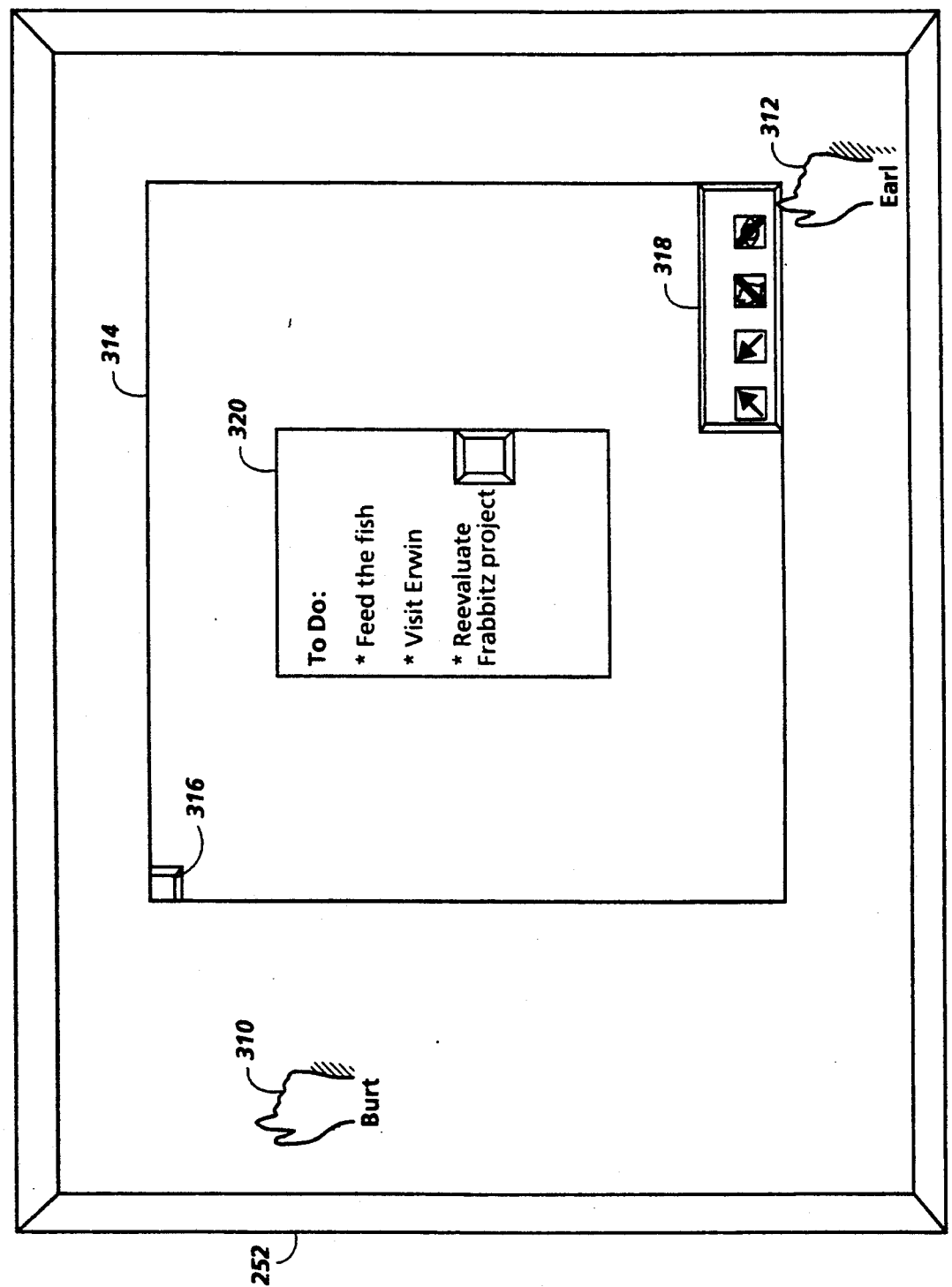
FIGS. 10A and 10B show simulated screen images subsequent to those in FIGS. 9A and 9B, showing how the non-private region has been made private in response to a request from a user at one of the workstations, according to the invention.
Figure 10B:
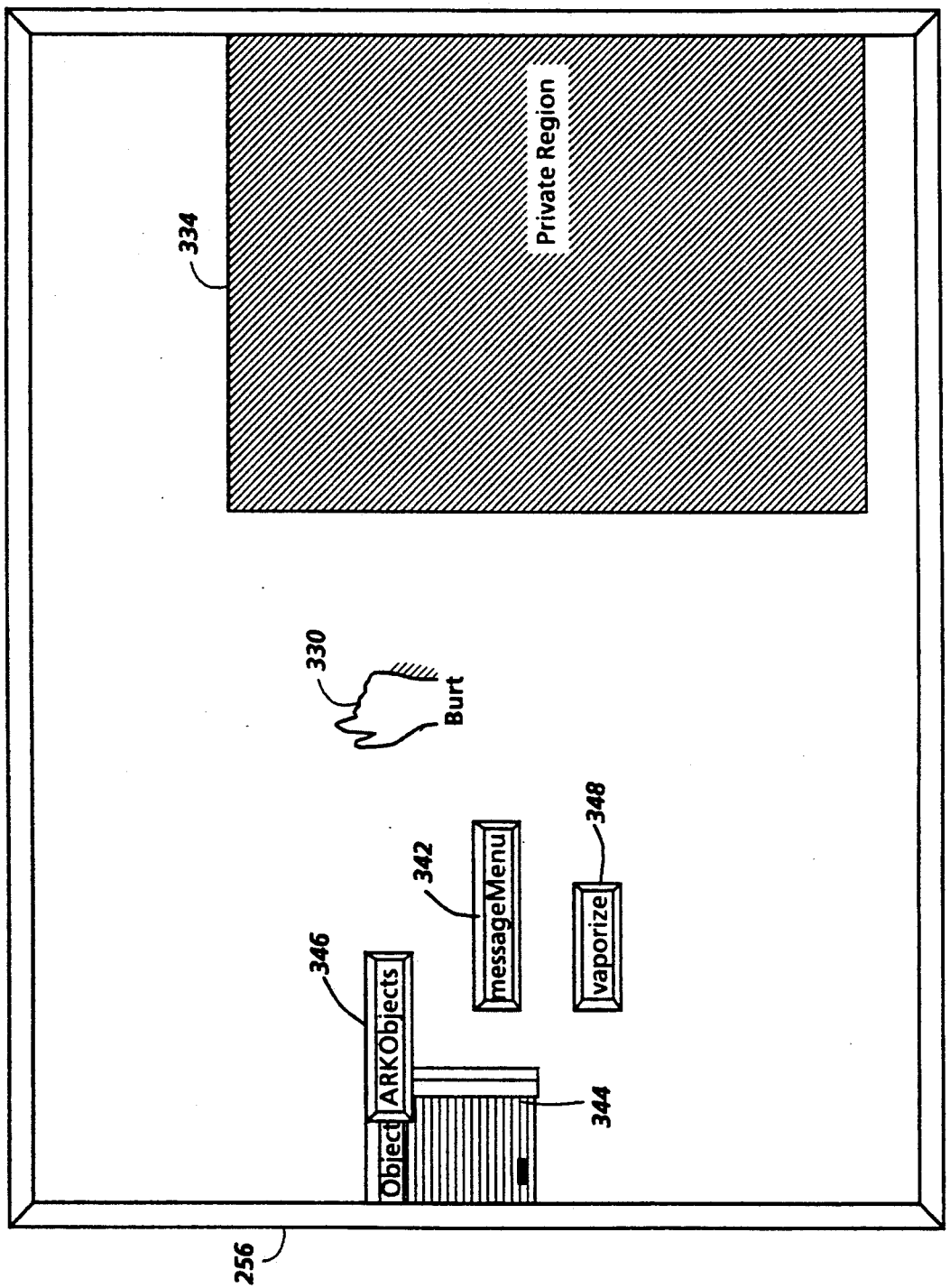
Figure 11:
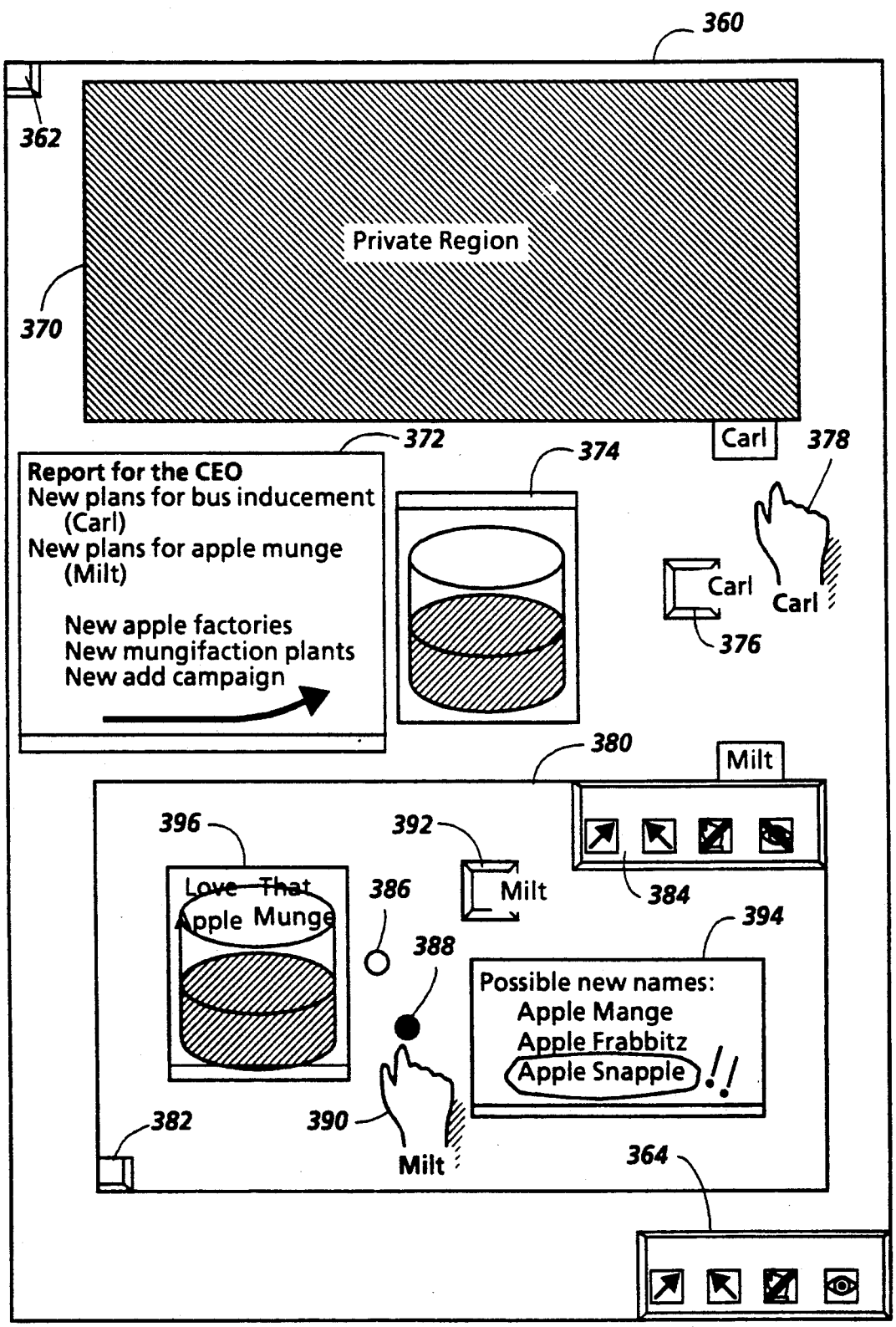
FIG. 11 is a simulated screen image showing nested regions that can be made private according to the invention.

FIGS. 9A and 9B illustrate two users' views of a shared workspace that includes a region that is not private, while FIGS. 10A and 10B show corresponding views of the same shared workspace after one of the users has requested that the region be made private. These simulated screen images show some display features described in the ARK article, including pointer display objects that appear as hands, each with a shadow to suggest that it is in a plane above the plane of the other display objects. The two users are illustratively named Burt and Earl, with views 250 and 252 in FIGS. 9A and 10A being Earl's views and views 254 and 256 in FIGS. 9B and 10B being Burt's views.

In Earl's view 250, Burt's hand 260 and Earl's hand 262 both appear, one of a number of cues that view 250 is a view of a shared workspace. Earl's view 250 could also show Burt's hand 260 moving in a purposeful manner, for example, another cue of a shared workspace. Earl's hand 262 appears within region 264, which has a rectangular boundary defined by corner display objects 266 and 268. Corner 268 includes several selectable display objects or buttons that can be selected to request changes in the state of region 264. The two left buttons can, for example, be used to request changes in the behavior of the boundary of region 264, with one button requesting that the boundary stop an object that attempts to cross it and another button requesting that the boundary hold an object that attempts to cross it. The two right buttons, on the other hand, can be used to request changes in the state of privacy of region 264, one button changing the state of privacy so that only the requesting user has access to modify region 264 or its contents, the other changing the state of privacy so that only the requesting user has visual access to the contents of region 264.

Earl's view 250 shows some other display objects, including window 270 within region 264 and messageMenu button 272. Window 270 in turn includes text and a typewriter object that responds to input from a keyboard by adding text. Button 272 is only partially visible, a cue that view 250 shows a virtual workspace, only part of which is presented at a time.

Burt's view 254 in FIG. 9B shows several display objects corresponding to display objects in Earl's view 250. Burt's hand 280 corresponds to Burt's hand 260; Earl's hand 282, only part of which is shown, corresponds to Earl's hand 262, and provides cues of a shared virtual workspace; region 284, corner display object 286, window 290, and button 292 correspond respectively to region 264, corner display object 266, window 270, and button 272. Burt's view 254 also shows other display objects not shown in Earl's view 250, including warehouse 294; ARKObjects button 296 used to obtain an ARKObject from warehouse 294 as described in the ARK article; and vaporize button 298, used to delete an ARKObject. In general, buttons like buttons 292, 296, and 298 can be dropped onto another object and then activated to perform an operation on the other object, as described in the ARK article.

Earl's view 252 in FIG. 10A shows generally the same display objects as in view 250 in FIG. 9A, with Burt's hand 310 corresponding to Burt's hand 260; Earl's hand 312 corresponding to Earl's hand 262, although its position relative to other display objects in the shared workspace has changed somewhat; and region 314, corner display objects 316 and 318, and window 320 corresponding respectively to region 264, corner display objects 266 and 268, and window 270. As shown in corner display object 318, however, Earl's hand has selected the two buttons requesting that region 314 be made private, and the system has responded by putting a bar across each of those buttons, indicating that only Earl has visual access and access to modify for region 320.

As a result of Earl's request to make the region private, Burt's view 256 in FIG. 10B is changed substantially from Burt's view 252 in FIG. 9B. Burt's hand 330 still corresponds to Burt's hand 280 and objects 342, 344, 346, and 348 still correspond respectively to objects 292, 294, 296 and 298. But the contents of region 284 are no longer visible. Instead, Burt's view 256 includes private region 334, which appears as a gray pattern without any contents. Therefore, Burt does not have visual access to the region, and, as mentioned above, also does not have access to modify, which Burt would discover by attempting to move his hand 330 into private region 334.

FIG. 10B illustrates an additional cue of a shared workspace. The appearance of a private region indicates that another user is viewing the same workspace and has requested that the region be made private. FIGS. 10A and 10B also illustrate how a private region can be used to make an object private. By requesting that region 314 be private, Earl has effectively made window 320 private because Burt can neither see nor modify a corresponding window within private region 334. Earl could, however, move window 320 out of region 314, at which time it would become public again.

FIG. 11 illustrates further examples of how objects can be made private through being included in private regions. Outer region 360 is a private region within a shared workspace presented to at least two users, Milt and Carl, with FIG. 11 showing Milt's view. Its boundary is determined by the positions of corner display objects 362 and 364. The buttons on corner display object 364 indicate that region 360 is subject to a level of privacy that provides visual access to all users but that provides access to modify only to a subset of users. Carl and Milt are in the subset of users with access to modify region 360 and it contents.

Region 360 includes a number of display objects. Private region 370 is a region to which Milt does not have visual access, but to which Carl has access, as indicated by the tab attached to the gray pattern covering the region. Region 360 also includes windows 372 and 374, Carl's typewriter object 376, and Carl's hand 378. Finally, region 360 includes private region 380 with a boundary determined by the positions of corner display objects 382 and 384. As indicated by the buttons on corner display object 384 and by the tab attached to its boundary, only Milt has visual access and access to modify region 380 and its contents. Therefore, Milt can move an object into region 380 in order to make it private, or can move an object out of region 380 in order to make it accessible to Carl. Alternatively, Milt can modify the privacy of an object in region 380 by selecting the appropriate button on corner display object 384. Furthermore, since Milt has access to modify the size and shape of region 380, Milt could make all or part of a display object private by using Milt's hand 390 to drop corner display objects 382 and 384 on the perimeter of the object or within the object, in which case private region 380 would sit on top of the private object.

The objects within region 380 include markers 386 and 388, Milt's hand 390, Milt's typewriter button 392, and windows 394 and 396. In accordance with the metaphor described in the ARK article, Milt can use Milt's hand 390 to pick up one of markers 386 and 388 and can use it to make marks such as those shown in windows 372 and 394.

FIG. 11 illustrates an advantage for a user interface designer in using private regions. If privacy is done on a regional basis, no extra design is required for attaining privacy for an object in the user interface; a new object being designed can simply be placed within a region that can be made private.

If privacy is instead done on an object-by-object basis, the interface designer must explicitly worry about how to provide a level of privacy for each new display object. If the designer is coding in an object-oriented software system, in which privacy mechanisms are automatically inherited by all new objects, the designer still must take care not to override or interfere with these privacy mechanisms. For example, mouse button clicks, menu definitions, etc. might be used to provide privacy, so that the designer must use these features carefully. Furthermore, any inherited privacy mechanisms will encumber the interface to the object. For example, the third mouse button click may not be available because it sets privacy—or a menu may now be larger, since it includes privacy commands.

If any object can be made private with the simple mechanism of a private region, as illustrated in FIG. 11, the user need not deal with some objects for which privacy is not implemented or is implemented differently than for other objects. The user also need not learn which objects have these privacy mechanisms. Instead, the user can assemble a "working set" of objects in a region, such as region 380 in FIG. 11, all of which can be made public or private by selecting a button.

In addition, as illustrated in FIG. 11, the private region mechanism allows users to subdivide a region they share into private regions and public areas around the private regions. Due to the manner in which regions can be nested within regions, this provides a nesting of privacy, with the most private regions contained within less private regions, and with the most public regions being outermost. Although nested, the state of privacy of each region can be stored and maintained such that a request for an operation by any user only requires a determination of whether that user has sufficient access for the region involved with the requested operation.

We turn now to additional features relating to navigation within a shared virtual workspace and to a technique for providing access objects within the metaphor described in the ARK article.

3. Private Navigation

The multiple workspace application, incorporated by reference above, describes techniques for switching between virtual workspaces. Acceleration techniques similar to the doors described in the multiple workspace application can be used for switching or navigating between parts of a large shared virtual workspace. As described above, however, each user of the shared workspace may have unique navigational requirements, so that a set of door-like accelerators that is appropriate for one user may be inappropriate for another user. If the accelerators are available to be modified by any of the users, conflict between users may interfere with the usefulness of the accelerators.

Figure 12:
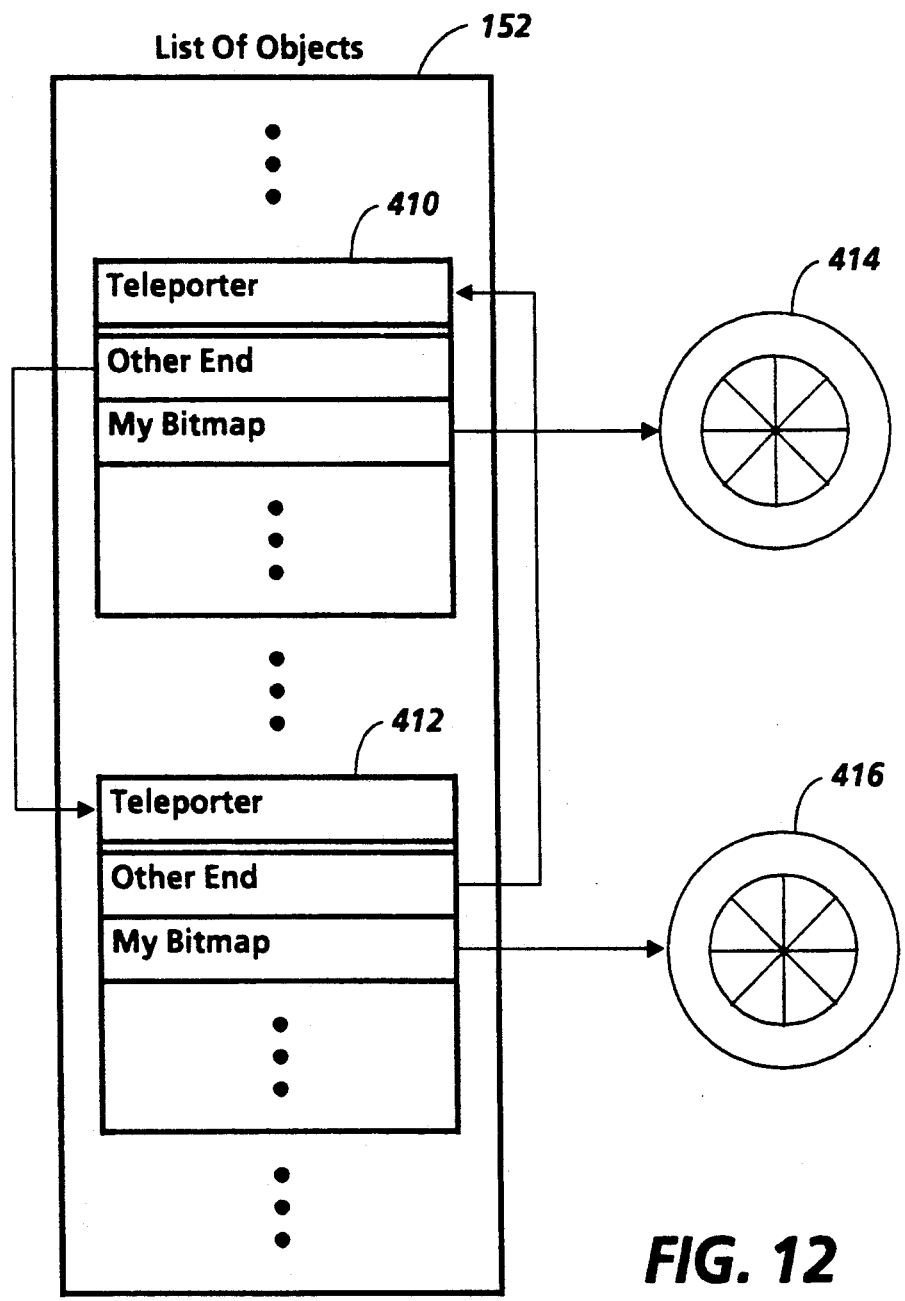
FIG. 12 is a schematic block diagram showing structure and a relation between teleporter system objects within the Shared Ark system in FIG. 5.

FIG. 12 illustrates system objects in list of objects 152 that can serve as accelerators, as implemented in Appendix A. Furthermore, these objects, like other objects in list of objects 152, can be made private by being positioned within a private region. As a result, a user can set up a private navigational network that other users cannot modify, thus avoiding conflicts.

As shown in FIG. 12, list of objects 152 includes two instances of a new class "Teleporter." As implemented in Appendix A, the class "Teleporter" is a subclass of the class "ARKObject," and has one additional instance variable, "otherEnd," and several methods. Teleporters 410 and 412 form a pair, with each having a pointer associated with its instance variable "otherEnd" that leads to the other teleporter. It would also be possible to set up a loop of teleporters, with each leading to the next one in the loop through its instance variable "otherEnd." Furthermore, a one-way teleporter could be created, with its instance variable "otherEnd" leading to an object other than a teleporter. Like instances of the class "ARKObject," instances of the class "Teleporter" have an instance variable "myBitmap," illustratively having associated pointers to bitmaps 414 and 416, graphically suggesting a pair of ports.

A user can use a teleporter to make a transition to its paired teleporter. The user does so by dropping an object onto the teleporter. In response, in accordance with the method "step" of the class "Teleporter," the system position the object in the part of the shared workspace near the paired teleporter, and at the same time makes a transition so that the view shows the part of the shared workspace that includes the paired teleporter.

If teleporter 410 were in a private region and teleporter 412 were in a public part of a shared virtual workspace, a user without access to modify the private region would not be able to move an object into the private region through teleporter 412, in the implementation of Appendix A. This follows because the "step" method of the class "Teleporter" relies on the inherited method "setPosition: aPoint" of class "ARKObject" for the transition between a teleporter 412 and its paired teleporter 410; the method "setPosition: aPoint" of class "ARKObject," as implemented in Appendix A, does not allow any user to move an object into a private region.

Privacy could alternatively be enforced by determining which user caused the current "setPosition: aPoint" message based on the pending stack of messages, and then respond according to that user's level of access to the private region involved, following the general steps in FIG. 4. Each user's instance of the class "ARKHand" could have an instance variable with an associated pointer to data defining that user's level of access to each private region. This alternative mechanism would be similarly effective to prevent a user from using a teleporter to move an object into a private region.

We turn now to consider in more detail how such an alternative mechanism could be implemented.

4. Access objects

Figure 13:
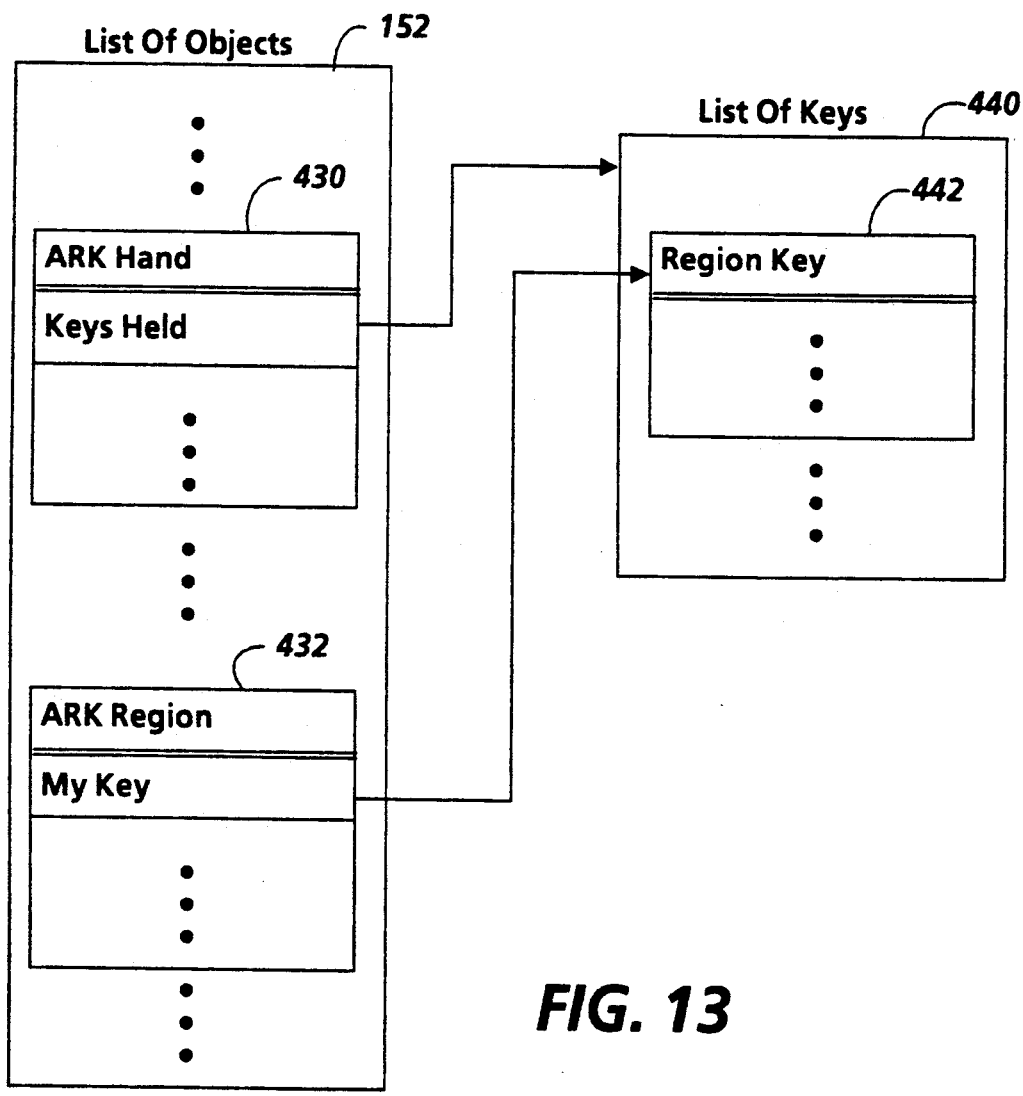
FIG. 13 is a schematic block diagram showing additional structure and relations involving key system objects.

In order to integrate the levels of privacy with the physical metaphor described in the ARK article, it is useful to provide a display object that corresponds to a given user's access to a private region. FIG. 13 illustrates a system object that could be used to provide such a display object through a modification of the implementation of Appendix A.

List of objects 152 in FIG. 13 includes ARKHand 430, an instance of class "ARKHand," and ARKRegion 432, an instance of class "ARKRegion." In addition to the instance variables set forth in Appendix A, however, these system objects include additional instance variables and appropriate methods. ARKHand 430 has instance variable "keysHeld" with an associated pointer to list of keys 440. ARKRegion 432 has instance variable "myKey" with an associated pointer to RegionKey 442, one of the system objects in list of keys 442. RegionKey 442 is an instance of a class "RegionKey" that could be a subclass of class "ARKObject." The class "RegionKey" could also have additional instance variables and methods to give it further features. For example, each instance of "RegionKey" could have state to indicate its history, so that an original key system object could be copied by the owner to provide keys to others, but the copies could not be copied. In general, providing extra state for a key system object would allow for improvements or additional features.

The implementation of Appendix A could be modified so that the method "setPosition: aPoint" of the class "ARKHand," upon receiving a request through ARKHand 430 involving ARKRegion 432, would determine whether the associated pointer of the instance variable "keysHeld" for ARKHand 430 points to list of keys 440 that includes a system object to which the instance variable "myKey" of ARKRegion 432 has an associated pointer. If so, ARKHand 430 has access to perform a requested operation involving ARKRegion 432. Similarly, the method "respondToHand: anARKHand" of the class "ARKRegion" could be modified to provide an instance of the class "RegionKey" to a user that requested that an instance of class "ARKRegion" be made private.

Alternatively, the metaphor of grabbing and holding an object could be applied to each instance of class "RegionKey" so that RegionKey 442 would only proivde access to ARKRegion 432 if ARKHand 430 had a pointer to RegionKey 442 associated with its instance variable "grabbedObject." In other words, the user would use the physical display object corresponding to ARKHand 430 to grab the physical display object corresponding to RegionKey 442, after which the user would move ARKHand 430 into the private region corresonding to ARKRegion 432.

C. Miscellaneous

The invention could be implemented in various other ways in addition to the specific implementations described above and illustrated in Appendix A. For example, rather than distributing the updating function to each workstation, updating could be synchronized and performed by operations of a central serve. The serve could apply the level of privacy in a region to determine which updates to send to which workstations. A server implementation could be more efficient in some ways, because notification would not be necessary at every step for every object at every workstation and because graphical updates could run in parallel with the method "step." The server could also resolve conflicting selections relating to privacy if made in the same step. A server could wait to update the workstations until it receives a signal indicating conclusion of a given step from each workstation, at which time it would update the workstations and permit them to continue to the next step. The server could employ conventional techniques such as NeWS or XWindows for providing a graphical user interface.

In the implementation of Appendix A, all of the participating workstations must begin the session at approximately the same time, because each must provide appropriate signals to each of the others to initiate the session. This could be modified to allow participants to enter and exit the session at any time. Furthermore, a server implementation could have special mechanisms under which each participant would send signals to the server to log in or log off. A mechanism could also be provided to detect an inactive participant, and to determine whether to log that participant off or to keep it in the session.

The "step" method of the class "SharedARK" could be interrupt driven, so that a step would occur for each interrupt. Under conventional Smalltalk-80, the interrupt handler can respond to an input by storing data for the interrupt at any time.

The implementation of Appendix A allows for one Shared ARK session on a workstation at a time, but it would be possible to have more than one Shared ARK session at a time on a given workstation. Each session would have a corresponding window, and the window could be tiled or overlapping as appropriate. Additional techniques could be used for formation of groups as described in the shared workspace application.

The implementation of Appendix A relies on features like those set forth in Appendix B to provide interaction with a network. This implementation could be modified in a straightforward manner for interfacing to any appropriate network for interconecting workstations.

A wide variety of levels of privacy could be implemented. The implementation of Appendix A provides a single type of access, which includes visual access and access to modify—no one except the owner of a private region can see its contents or move a pointer into it. The implementations illustrated in FIGS. 9A, 9B, 10A, 10B, and 11 provide additional levels of privacy, which could be implemented in a straightforward manner. In general, it would be straightforward to allow for multiple users with access to a private region, such as through a list of owning hosts, and to allow for multiple levels of access applicable to different subsets of users, such as through multiple buttons for selecting different levels of privacy. Different types of key objects could be provided for different levels of access.

The implementation of Appendix A denies a request to move an object into a private region by positioning the object adjacent the private region. Denial of a request for an operation involving a region could be implemented in a variety of ways, including returning an object to its previous position or moving it as close to the expected position as possible.

The invention could be used in a variety of applications. For example, a shared workspace with private regions could be used to implement a user interface for a communication system, as described in copending, coassigned U.S patent application Ser. No. 101,711, entitled "User Interface Control for Communication System", now issued as U.S. Pat. No. 4,987,492 and incorporated herein by reference. Each user's pointer could be an image of that user that can be recognized by other users. A private region could be used to avoid interruptions, or to provide one-way outward viewing, allowing a level of privacy for a user's activities. A private region could also be used for a private meeting of a group that excludes some users, in which case the communication system could provide video and audio links between the users with pointers in the private region. Serendipitous meetings could occur when users in the same part of the shared workspace recognize each other's images, in which case they could set up a private region and establish video and audio links. In short, the invention can provide familiar cues that facilitate socially and ethically appropriate behavior.

The invention has been described in relation to the user interface features described in the ARK article, but the invention would be applicable to any shared window system or any other shared workspace system. Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

Shared ARK System

*To create a Shared ARK system, one must implement all the classes in Appendices A and B and their methods for a specific workstation-network combination. The Smalltalk-80 class "Object class" must be modified so that its method "new" is as follows:* new

↑ *self basicNew initialize*

*Then the Shared ARK system software can be run by executing the Smalltalk-80 expression:*

*SharedARKView new.*

StandardSystemController subclass: #SharedARKController
    instanceVariableNames: ''
    classVariableNames: ''
    poolDictionaries: ''
    category: 'SHARK' methods close
    *"Not necessary ... release causes circular data structures to be removed"*
    super close.
    model release.

controlActivity
    super controlActivity.  *"...using inherited behavior first."*
    status = = #closed ifFalse: [model step].

controlInitialize
    *"Simply blanks out the cursor."*
    super controlInitialize.  *"...using inherited behavior first."*
    Cursor blank show.

controlTerminate
    *"Simply returns the normal cursor."*
    super controlTerminate.  *"...using inherited behavior first."*
    Cursor normal show.

StandardSystemView subclass: #SharedARKView
   instanceVariableNames: 'bitmap'
   classVariableNames: ''
   poolDictionaries: ''
   category: 'SHARK' methods computeInsetDisplayBox
   *"A message required by the window system .. in addition to the
   inherited method, we inform the model of the new displayBox size."*
   | b |
   b ← super computeInsetDisplayBox.
   model localInputBroadcaster setDisplayBox: (b insetBy: self borderWidth).
   ↑ b defaultControllerClass
   *"This is sent by the system when the window is being constructed.
   The value returned is assumed to be the class of controller
   intended for use with this view."*

↑ SharedARKController displayViewOn: aDisplayMedium
   *"This is the mechanism for displaying when the window system
   asks the view to display."*
   self displayBorderOn: aDisplayMedium. *"..inherited"*
   self displayLabelOn: aDisplayMedium. *"..inherited"*
   super displayViewOn: aDisplayMedium. *"..inherited"*
   bitmap white.
   model objects do:
      [:eachObject |
      eachObject
         displayOn: bitmap
         at: eachObject position - model localInputBroadcaster drift.].
   model regions do:
      [:eachRegion |
      eachRegion censorIfNecessaryOn: aDisplayMedium].
   bitmap displayOn: aDisplayMedium at: insetDisplayBox origin.
   *"'displayOn:' is a known method for bitmaps"* getFrame
   *"Sent when the controller is asked to open, or when user wants
   to reshape window. Asks user for displayBox."*
   | theDisplayBox |
   theDisplayBox ← (super getFrame) . *"... first use inherited method."*
   model localInputBroadcaster setDisplayBox: (theDisplayBox insetBy: self borderWidth).
   bitmap ← (Form extent: (theDisplayBox insetBy: self borderWidth) extent).
   *"Smalltalk class 'Form' is the class that represents bitmaps.
   Sending Form the message 'extent:' creates a new bitmap of the
   indicated size."*
   ↑ theDisplayBox initialize
    *"automatically sent by the system to this*
    *object when it has been created."* super initialize.             *"..inherited"*
    self model: SharedARK new.    *"..inherited, establishes view as*
                                           *'dependent' of model for the display*
                                           *mechanism (see the update: method)"*
    model establishInitialARKObjects.
    self label: 'a Shared ARK'.    *"..inherited"*
    self borderWidth: 2.        *"..inherited"*
    self controller open.       *"..inherited"*

*"'controller' and 'open' are existing methods*
    *that create the controller and do all the work*
    *necessary to put the window on the screen"* update: aParameter
*"This is sent to the view when the model (a SharedARK) sends itself the 'changed'
message. The cahnged message causes all the models dependents to get sent
update:. The model was established as a dependent in the inherited method
model:, which was sent in initialize."*
    super update: aParameter.
    *"Much like the method for displayViewOn: ..."*
    bitmap white.
    model objects do:
        [:eachObject |
        eachObject
            displayOn: bitmap
            at: eachObject position - model localInputBroadcaster drift.].
    model regions do:
        [:eachRegion |
        eachRegion censorIfNecessaryOn: bitmap].
   bitmap displayOn: (ScheduledControllers mediumFor: self) at: self
insetDisplayBox origin.

*"This last expression involves several messages that are part of the system, and
are ued for displaying objects on the screen in the presence of possibly overlapping
other windows."*

Object subclass: #SharedARK
  instanceVariableNames: 'objects localInputBroadcaster currentStep regions'
  classVariableNames: ''
  poolDictionaries: ''
  category: 'SHARK' methods release
  "*A clean-up message, for breaking circular structures...*"
  localInputBroadcaster close.
  objects do: [:ob | ob release.].

establishInitialARKObjects

| newHand list obj |

"*Create initial ARKObjects (other than hands)
  and set their positions in the world.
  Each new object is sent 'setWorld: self' at this time,
  and is added to the 'objects' list.
  If any of the new objects are ARKRegions, they
  are also added to the 'regions' list.
  The following code is arbitrary, depending on what
  set of objects are desired initially...*"

(obj ← ARKRegion new) setWorld: self; setPosition: 400@250.
  objects add: obj.
  regions add: obj.
  (obj ← ARKObject new) setWorld: self ; setPosition: 300@200.
  objects add: obj.
  (obj ← Teleporter new) setWorld: self ; setPosition: 50@300.
  objects add: obj.

"*Now set the initial ARKHands...*"
  list ← self getEtherAddressesFromUser.
  list do:
    [:remoteStateAddress |
    newHand ← ARKHand new.
    newHand setWorld: self.
    newHand setConnectionTo: remoteStateAddress.
    objects add: newHand.].

getEtherAddressesFromUser
  "*Ask the user for the host names for which this session
  will be sharing. The method returns an associated list of ether addresses,
  including the known port number of the associated host's
  InputStateBroadcaster.
  AUTOMATICALLY ADD TO THE LIST THE ADDRESS FOR THE
  LOCAL HOST*"

| list | list ← Array new.
"*The programmer can insert names of other hosts here, or more likely, insert user interface code to directly request host names from the user. The host names must then be translated to network addresses. An example of ignoring the user and hard-coding another host addresses:*

*list add: (PupAddress net: 142 host: 242 socket: 255).*
*list add: (PupAddress net: 142 host: 424 socket: 255).*

*..with each PupAddress representing one of the hosts in the session.*"

list add: (PupAddress
           net: TheNetwork localNetNumber
           host: TheNetwork localHostNumber
           socket: 255).
↑ list initialize
"*automatically sent when the object is created*"
objects ← OrderedCollection new.
currentStep ← 0.
regions ← Array new.
localInputBroadcaster ← InputStateBroadcaster fromSocket: 255 to: (PupAddress new).
"*The localInputBroadcaster's foreignPort address is reset in the broadcastState method.*"
localInputBroadcaster maxTransmissions: 20. "*Sets the redundancy.*"
localInputBroadcaster startReceiving. "Does what it says."

objectsContainingPoint: aPoint
"*What objects in the world contain this coordinate? Return an OrderedCollection with the answer.*"
| coll |
coll ← OrderedCollection new.
objects do:
    [:obj |
    "*Construct a rectangle which marks the bounds of obj...*"
    ((Rectangle
        origin: obj position
        extent: obj myBitmap extent)
           "*... and ask it if it contains the point:*"
        containsPoint: aPoint)
           ifTrue:
               [coll add: obj]
    ].
↑ coll objectsOverlapping: anARKObject

"*What objects in the world overlap with anARKObject? Return an OrderedCollection with the answer.*"
| coll rect |
    rect ← Rectangle origin: anARKObject position extent: anARKObject myBitmap extent.
    "*...rect is the bounds of anARKObject.*"
    coll ← OrderedCollection new.
    objects do:
        [:obj |
        anARKObject = = obj
            ifFalse:
                [ "*Construct a rectangle which marks the bounds of obj...*"
                ((Rectangle
                      origin: obj position
                      extent: obj myBitmap extent)
                          intersects: rect)
                              ifTrue:
                                  [coll add: obj]
        ].
    ].
    ↑ coll regionsOverlapping: anARKObject

"*What regions in the world overlap with anARKObject? Return an OrderedCollection with the answer.*"
| coll rect |
    rect ← Rectangle origin: anARKObject position extent: anARKObject myBitmap extent.
    "*...rect is the bounds of anARKObject.*"
    coll ← OrderedCollection new.
    regions do:
        [:reg |
        (reg regionRectangle intersects: rect)
            ifTrue:
                [coll add: reg]
    ].
    ↑ coll step
    "*The central method running the simulated world...*"
    currentStep ← currentStep + 1.
    localInputBroadcaster broadcastStateNumbered: currentStep.
    objects do: [:eachObject | eachObject step.].
    "*The world is now ready to be displayed, so...*"
    self changed.
    "*...which will cause the view to be sent the message
    'update:' which makes the image appear on the display.*"

Object subclass: #ARKObject
    instanceVariableNames: 'position velocity objectsISupport objectIRestOn world myBitmap '
    classVariableNames: ''
    poolDictionaries: ''
    category: 'SHARK' methods objectIRestOn: anARKObject objectIRestOn ← anARKObject displayOn: medium at: aPoint
    myBitmap displayOn: medium at: aPoint extent: size

| new |
    new ← Form extent: size.
    myBitmap displayOn: new.
    myBitmap ← new.

failedMoveTo: aPoint

*"Do nothing is one way to not get into a region"*
initialize position ← 0@0.
    velocity ← 0@0.
    objectsISupport ← OrderedCollection new.
    objectIRestOn ← nil.
    myBitmap ← Form extent: 100@100.
    myBitmap black.

objectsISupportTransitive

| coll |
    coll ← OrderedCollection new.
    coll addAll: objectsISupport.
    objectsISupport do:
        [:obj |
        coll addAllLast: obj objectsISupportTransitive.].
    ↑ coll releaseBy: aHand

| rect owner |
    world regions do:
        [:region |
        ((rect ← region regionRectangle) intersects: (Rectangle origin: position extent: myBitmap extent) )
            ifTrue: *"inside this region..."*
                [(owner ← region owningHostAddress) ~~nil

```
                        ifTrue:
                            [aHand inputState foreignPort = owner
                                    ifFalse: "try again but at a different position, outside the
region..."
                                    [position ← rect corner + (1@1).
                                    ↑ self releaseBy: aHand ] ] ] ].
    (world objectsOverlapping: self) reverseDo:
        [:obj |
        obj = = aHand | (objectsISupport includes: obj)
            ifFalse:
                [obj objectsISupport add: self.
                objectIRestOn ← obj.
                world objects remove: self.
                world objects add: self after: obj.
                ↑ self]].
``` respondToHand: anARKHand
    ↑ self setPosition: aPoint
    "Move to a new position. If the object is already in a region, it will be
    allowed to stay. If it is attempting to move into a region, and the region is
    private (locked) then the move fails."
    |rect|
    world = = nil ifTrue: [position ← aPoint. ↑self].
    world regions do:
        [:region |
        ((rect ← region regionRectangle) intersects: (Rectangle origin: aPoint extent: myBitmap extent) )
            ifTrue: "overlapped with this guy..."
                [( rect intersects: (Rectangle origin: position extent: myBitmap extent))
                    ifFalse: "Not already in this region"
                        [(region owningHostAddress ~~ nil)
                            ifTrue: "and shouldn't be"
                                [ ↑ self failedMoveTo: aPoint] ] ] ].

objectsISupport do:
        [:obj | obj setPosition: aPoint + obj position - position].

position ← aPoint.

setWorld: aSharedARK
    world ← aSharedARK step color: foo

| newBitmap |
    newBitmap ← Form extent: myBitmap extent.
    newBitmap perform: foo.
    myBitmap ← newBitmap.

release
    world ← nil.
    super release.

ARKObject subclass: #ARKHand
    instanceVariableNames: 'grabbedObject inputState '
    classVariableNames: ''
    poolDictionaries: ''
    category: 'SHARK' methods dealWithButtonState

| leftButtonDown middleButtonDown |
    leftButtonDown ← (inputState buttonState = = 4).
    middleButtonDown ← (inputState buttonState = = 2).
    grabbedObject ~~ nil & leftButtonDown not
        ifTrue:
            [self dropObject.].
    grabbedObject = = nil & leftButtonDown
        ifTrue:
            [self tryGrabbing].
    grabbedObject = = nil & middleButtonDown
        ifTrue:
            [self tryActivating].

displayOn: medium at: aPoint myBitmap displayOn: medium at: aPoint rule: Form reverse mask: nil dropObject grabbedObject releaseBy: self.
    grabbedObject ← nil.

initialize super initialize.
    myBitmap ← Form extent: 16@16.
    Cursor normal displayOn: myBitmap.

setConnectionTo: remoteStateAddress
    "This message is sent just after the hand
    is created, before it gets used."
    | socketNum |
    grabbedObject ← nil.
    socketNum ← 254.
    [(Ether socketNumber: socketNum) = = nil]
        whileFalse:
            [socketNum ← socketNum -1].
    inputState ← RemoteInputState fromSocket: socketNum to:
    remoteStateAddress.
        inputState introduceYourself.
    "inputState startListeningTo: remoteStateAddress."

setPosition: aPoint
   "*Move to a new position. If the object is already in a region, it will be allowed to stay. If it is attempting to move into a region, and the region is private (locked) then the move fails.*"
   | rect |
   world = = nil ifTrue: [position ← aPoint. ↑ self].
   world regions do:
      [:region |
      ((rect ← region regionRectangle) intersects: (Rectangle origin: aPoint extent: myBitmap extent))
         ifTrue: "*overlapped with this guy...*"
            [( rect intersects: (Rectangle origin: position extent: myBitmap extent))
               ifFalse: "*Not already in this region*"
                  [(region owningHostAddress ~~ nil and: [region owningHostAddress ~ = inputState foreignPort])
                     ifTrue: "*and shouldn't be*"
                        [ ↑ self failedMoveTo: aPoint] ] ] ].

position ← aPoint.

step inputState waitForNextPacketAndSetState.
   self setPosition: inputState cursorPoint - inputState displayBox origin + inputState drift.
   self dealWithButtonState.
   grabbedObject = = nil
      ifFalse:
         [grabbedObject setPosition: position].

tryActivating

(world objectsContainingPoint: position) reverseDo:
      [:obj |
      obj = = self
         ifFalse:
            [obj respondToHand: self.
            ↑ self]
      ]

tryGrabbing

| restedOn |
   (world objectsContainingPoint: position) reverseDo:
      [:obj |
      obj = = self
         ifFalse:
            [grabbedObject ← obj.
            (restedOn ← obj objectIRestOn) = = nil
               ifFalse:
                  [obj objectIRestOn: nil.
                  restedOn objectsISupport remove: obj.].
            "*This next part simply rearranges the order of objects so that they are drawn correctly*"

```
                        (world objects) remove: grabbedObject; add: grabbedObject before:
self.
                        grabbedObject objectsISupportTransitive reverseDo:
                            [:supObj|
                            (world objects) remove: supObj; add: supObj after:
grabbedObject.].
                ↑ self]
    ]
``` release
```
    inputState close.
    super release.
```

ARKObject subclass: #ARKRegion
    instanceVariableNames: 'cornerObject buttonRectangle owningHostAddress'
    classVariableNames: ''
    poolDictionaries: ''
    category: 'SHARK' methods color: aMaskName
```
    super color: aMaskName.
    cornerObject color: aMaskName.
``` censorIfNecessaryOn: aDisplayMedium
```
    owningHostAddress = = nil ifTrue: [↑ self].
    owningHostAddress = world localInputBroadcaster localPort
        ifFalse:
            [aDisplayMedium fill: self regionDisplayRectangle rule: 3 mask: Form darkGray.].
``` displayOn: medium at: aPoint
```
    |rect|
    super displayOn: medium at: aPoint.
    rect ← self regionDisplayRectangle.
    medium drawLine: (Form extent: 3@3) black from: rect left@rect top to: rect right@rect top rule: 7 mask: Form lightGray.
    medium drawLine: (Form extent: 3@3) black from: rect left@rect bottom to: rect right@rect bottom rule: 7 mask: Form lightGray.
    medium drawLine: (Form extent: 3@3) black from: rect left@rect top to: rect left@rect bottom rule: 7 mask: Form lightGray.
    medium drawLine: (Form extent: 3@3) black from: rect right@rect bottom to: rect right@rect top rule: 7 mask: Form lightGray.
``` initialize
```
    super initialize.
    buttonRectangle ← Rectangle origin: 10@10 extent: 20@20.
    self extent: 40@40.
    cornerObject ← ARKObject new.
    cornerObject extent: 15@15.
    cornerObject setPosition: position + (150@150).
    self color: #gray.
    myBitmap fill: buttonRectangle rule: 3 mask: Form white.
``` regionDisplayRectangle
   | corn mine top left bottom right |
   corn ← cornerObject position - world localInputBroadcaster drift.
   mine ← position - world localInputBroadcaster drift.
   top ← corn y min: mine y.
   left ← corn x min: mine x.
   bottom ← corn y + cornerObject myBitmap height
          max: mine y + myBitmap height.
   right ← corn x + cornerObject myBitmap width
          max: mine x + myBitmap width.
   ↑ Rectangle origin: left@top corner: right@bottom regionRectangle
   | corn top left bottom right |
   corn ← cornerObject position.
   top ← corn y min: position y.
   left ← corn x min: position x.
   bottom ← corn y + cornerObject myBitmap height
          max: position y + myBitmap height.
   right ← corn x + cornerObject myBitmap width
          max: position x + myBitmap width.
   ↑ Rectangle origin: left@top corner: right@bottom respondToHand: anARKHand

((buttonRectangle translatedBy: position) containsPoint: anARKHand position)
       ifTrue:
          [owningHostAddress = = nil
             ifTrue: *"Set privacy"*
                [owningHostAddress ← anARKHand inputState foreignPort.
                myBitmap fill: buttonRectangle rule: 3 mask: Form darkGray.
                Transcript cr; show: 'Got private.']
             ifFalse:
                [owningHostAddress = = anARKHand inputState foreignPort
                   ifTrue: *"Turn off privacy"*
                      [myBitmap fill: buttonRectangle rule: 3 mask: Form white.
                      owningHostAddress ← nil.]
                   ifFalse: *"Wrong hand -- nothing happens"*
                      [].].].

setWorld: aSharedARK
   super setWorld: aSharedARK.
   cornerObject setWorld: aSharedARK.
   aSharedARK objects add: cornerObject.

```
ARKObject subclass: #Teleporter
    instanceVariableNames: 'otherEnd '
    classVariableNames: ''
    poolDictionaries: ''
    category: 'SHARK'
``` methods initialize

```
self initializeWithoutOtherEnd.
otherEnd ← (Teleporter basicNew) initializeWithoutOtherEnd.
otherEnd setOtherEnd: self.
otherEnd setPosition: position - otherEnd myBitmap extent - (100@100).
``` initializeWithoutOtherEnd

```
| newBitmap |
super initialize.
newBitmap ← Form extent: myBitmap extent.
newBitmap darkGray; borderWidth: 4.
myBitmap ← newBitmap.
``` setOtherEnd: anotherTeleporter

```
otherEnd ← anotherTeleporter.
``` setWorld: aSharedARK

```
super setWorld: aSharedARK.
otherEnd world = = aSharedARK
    ifFalse:
        [otherEnd setWorld: aSharedARK.
        aSharedARK objects add: otherEnd.].
``` step

```
| copy |
super step.
copy ← objectsISupport shallowCopy.
copy do:
    [:obj |
    obj objectIRestOn: nil.
    obj setPosition: otherEnd position + otherEnd myBitmap extent.
    objectsISupport remove: obj].
```

RetransmitSocket subclass: #InputStateBroadcaster
   instanceVariableNames: 'listOfAddresses cursorPoint buttonState keyboardQueue drift displayBox stepNumber'
   classVariableNames: ''
   poolDictionaries: ''
   category: 'SHARK' methods broadcastStateNumbered: currentStep
   |etherPacket|
   stepNumber ← currentStep.
   self captureInputState.
   self computeAndSetDrift.
   etherPacket ← self createStatePacket.
   listOfAddresses do:
      [:remoteInputAddresses |
      self foreignPort: remoteInputAddresses.
      nil = = (self
         addressAndWaitForReply: etherPacket
         suchThat: [:pup | (pup pupType = = 42) & (pup sourcePort = remoteInputAddresses)])
            ifTrue:
               [self error: 'Got no reply from ', remoteInputAddresses asName.].
      ]
   "Last method is inherited and does what it says."

captureInputState
   "Read the cursorPoint, buttonState, and keyboardQueue from the systems input device. Sert the corresponding instance variables."
   cursorPoint ← Sensor cursorPoint.
   buttonState ← Sensor buttons.
   keyboardQueue ← SharedQueue new.

computeAndSetDrift
   "In this method, the 'scrolling' of the 'view' onto the infinite plane is accomplished by adjusting the 'drift'.
   One way to do that is shown here"
   |delta|
   delta ← 0@0.
   cursorPoint x > displayBox right
      ifTrue:
         [delta ← delta + ((cursorPoint x - displayBox right)@0).].
   cursorPoint x < displayBox left
      ifTrue:
         [delta ← delta + ((cursorPoint x - displayBox left)@0).].
   cursorPoint y > displayBox bottom
      ifTrue:
         [delta ← delta + (0@(cursorPoint y - displayBox bottom)).].
   cursorPoint y < displayBox top
      ifTrue:
         [delta ← delta + (0@(cursorPoint y - displayBox top)).].
   drift ← drift + delta.
   Sensor cursorPoint: cursorPoint - delta.

createStatePacket
"*Encode the instance variabless
cursorPoint, buttonState, keyboardQueue, drift and displayBox.
into a new ether packet. Also encode the currentStep.
Return the created packet.*"
| pup |
pup ← Pup dataLength: 28.
pup dataWordAt: 1 put: cursorPoint x sign + 1.
pup dataWordAt: 2 put: cursorPoint x abs.
pup dataWordAt: 3 put: cursorPoint y sign + 1.
pup dataWordAt: 4 put: cursorPoint y abs.
pup dataWordAt: 5 put: buttonState.
pup dataWordAt: 6 put: drift x sign + 1.
pup dataWordAt: 7 put: drift x abs.
pup dataWordAt: 8 put: drift y sign + 1.
pup dataWordAt: 9 put: drift y abs.
pup dataWordAt: 10 put: displayBox origin x.
pup dataWordAt: 11 put: displayBox origin y.
pup dataWordAt: 12 put: displayBox extent x.
pup dataWordAt: 13 put: displayBox extent y.
pup dataWordAt: 14 put: stepNumber.
↑ pup initialize
super initialize.
listOfAddresses ← Array new.
drift ← 0@0. "0@0 is a cartesian point object"
"*The instance variables
cursorPoint, buttonState, and keyboardQueue
are not set until needed in the method createStatePacket.
The instance variable mediumBox is set later as soon as the
view knows its position on the screen.*"

receivePacket: anEtherPacket
"*This message is sent automatically by the system
when anEtherPacket arrives over the net.
The only type of packet received should be a 'reply' type
or an 'introductions' type from the RemoteInputState instances.
If the later is the case, extract the sender's address and add it to
listOfAddresses.*"

| oldAddress |
anEtherPacket pupType = = 42
    ifTrue: "*42 signals a reply pup ... process these through the inherited mechanism...*"
        [ ↑ super receivePacket: anEtherPacket].
"*Was not a reply pup, so must be an introduction pup. Send an
acknowledgemnt reply and set our address list.*"
oldAddress ← foreignPort.
foreignPort ← anEtherPacket sourcePort.
self addressAndSendPacket: (Pup type: 42).

foreignPort ← oldAddress.
(listOfAddresses includes: anEtherPacket sourcePort)
    ifFalse:
        [listOfAddresses add: anEtherPacket sourcePort]

setDisplayBox: aRectangle
displayBox ← aRectangle.

RetransmitSocket subclass: #RemoteInputState
    instanceVariableNames: 'cursorPoint buttonState keyboardQueue drift displayBox stepNumber'
    classVariableNames: ''
    poolDictionaries: ''
    category: 'SHARK' methods extractStateFromPacket: anEtherPacket
    *"Here the input state is decoded from the packet:
    cursorPoint, buttonState, keyboardQueue, drift, displayBox, and stepNumber
    are extracted. "*
    cursorPoint ← ((anEtherPacket dataWordAt: 1) - 1 * (anEtherPacket dataWordAt: 2)) @
                    ((anEtherPacket dataWordAt: 3) - 1 * (anEtherPacket dataWordAt: 4)).
        buttonState ← anEtherPacket dataWordAt: 5.
        drift ←((anEtherPacket dataWordAt: 6) - 1 * (anEtherPacket dataWordAt: 7)) @
                    ((anEtherPacket dataWordAt: 8) - 1 * (anEtherPacket dataWordAt: 9)).
        displayBox ← Rectangle
                        origin: ((anEtherPacket dataWordAt: 10) @ (anEtherPacket dataWordAt: 11))
                        extent: ((anEtherPacket dataWordAt: 12) @ (anEtherPacket dataWordAt: 13)).
        stepNumber ← anEtherPacket dataWordAt: 14.

introduceYourself
    *"Send packet to the InputStateBroadcaster that
    request that it register this address in its list of
    remote receivers. Use a reliable protocol, which
    waits for a reply."*

| introductionPacket |
    introductionPacket ← (Pup dataLength: 0).

nil = = (self
            addressAndWaitForReply: introductionPacket
            suchThat: [:pup | (pup pupType = = 42) & (pup sourcePort = foreignPort)])
                ifTrue:
                    [self error: 'Could not introduce myself to', foreignPort asName.].

receivePacket: pup
"*This packet was just received from the Ethernet. Its destination socket matches my foreignPort. If I want to receive packets, verify the checksum append it to the input packet queue. If the input queue is full, ignore the packet.
This method runs at lowIOPriority in a shared process used to dispatch all incoming packets.*"

receivePackets ifTrue:
       [(inputPacketQ nextPutIfNotFull: pup)
         ifTrue:
           [self addressAndSendPacket: (Pup type: 42). "*...sending a reply pup.*"]]

waitForNextPacketAndSetState
    | retryCount next |
    retryCount ← 0.
    [(next ← inputPacketQ peek) = = nil or: [((next ← inputPacketQ next) dataWordAt: 14) = = stepNumber]]
       whileTrue:
         [(Delay forMilliseconds: 200) wait.
         retryCount > 25 ifTrue: [self error: 'Gave up waiting for packet.'].
         retryCount ← retryCount + 1.].
    self extractStateFromPacket: next.

APPENDIX B

Network Classes

*The four classes in this Appendix support use of a network. Two of these classes are completely defined, while two are described in words to facilitate support of different network hardware and protocols.*

Class EtherDevice

*The global variable called "TheNetwork" is the sole instance of this class. It is the Smalltalk object providing basic primitive interface to the ethernet hardware. It is described here in complete detail, except for the two primitive methods. The functionality of these two primitives is described in the comment associated with each method. After the primitives are installed and this class is defined, the implementor should execute:*
    TheNetwork ← EtherDevice new.

----------------------

Object subclass: #EtherDevice
    instanceVariableNames: 'localNetNumber localHostNumber socketTable socketProtect receivePackets'
    classVariableNames: ''
    poolDictionaries: ''
    category: 'Ethernet-Kernel' initialize
    "The implementor should set the localNetNumber and localHostNumber in this method."
    localNetNumber ← 042 "..provide code or a number to represent this net."
    localHostNumber ← 420 "..provide code or a number to represent this host."
    socketTable ← Dictionary new.
    "..this dictionary holds associations between socket numbers and socket objects."
    socketProtect ← Semaphore forMutualExclusion.
    "...this semaphore is to prevent various processes from interrupting each other as they access the socketTable."
    self startInputProcess.
    receivePackets ← false.

localNetNumber
    ↑ localNetNumber localHostNumber
    ↑ localHostNumber sendPacket: aPacket
    "If the network hardware does not deal with 'routing' of packets between networks, the implementor may have to deal with routing of the packet in this method, if it has not been dealt with in the message destinationPort: for class Pup."
    (aPacket destinationPort net = localNetNumber)
    &
    (aPacket destinationPort host = localHostNumber)

ifTrue : *"...bypass the ethernet device and directly receive packet here..."*
  [(socketTable at: aPacket destinationPort) receivePacket: aPacket.]
    ifFalse:
      [self primitiveSendPacket: aPacket asByteArray size: aPacket asByteArray size].

addSocket: aSocket
  socketProtect critical:
    [socketTable at: aSocket localPort put: aSocket].

socketNumber: anInteger
  socketProtect critical:
    [↑ socketTable at: anInteger ifAbsent: [↑ nil]]

removeSocketNumber: anInteger
  socketProtect critical:
    [socketTable removeKey: anInteger ifAbsent: []]

startInputProcess
  *"Fork a highIOPriority process for queueing packets off the Ethernet."*

| currentPacket nextPacket interruptSemaphore networkInputProcess |
  interruptSemaphore ← Semaphore new.
  inputArray ← ByteArray new: 1600.
  nextArray ← ByteArray new: 1600.
  self primitiveReceiveInto: inputArray signal: interruptSemaphore.
  networkInputProcess ←
  [   [true] whileTrue:
        [interruptSemaphore wait. *"Wait for a packet"*
        currentPacket ← Pup newFromByteArray: inputArray.
        *"Restart the primitive immediately."*
        inputArray ← nextArray.
        self primitiveReceiveInto: inputArray signal: interruptSemaphore.
        receivePackets
          ifTrue:
            [(socket ← self socketNumber: currentPacket desinationPort socket)
              = = nil
                ifFalse:
                  [socket receivePacket: currentPacket].].
        nextArray ← ByteArray new: 1600]
  ] forkAt: 7 *"... 7 indicates a very high priority (for important I/O events)"* primitiveSendPacket: byteArray size: byteCount
  *"Code omitted - hardware specific. This method should be implemented as a primitive.*

*Sends a packet. If the packet is transmitted successfully within this time, the primitive returns true. Otherwise (presumably because there was a collision and the packet must be retransmitted, or the controller or the Ethernet itself is malfunctioning) the primitive returns false.*

*The primitive fails if the byteArray is not a byte-type object, or if the byteCount is not a SmallInteger, or is out of range, or if a packet is still in the process of being transmitted, or if the packet is too large to transmit. An odd size is acceptable, and will result in one garbage byte being added to the packet.*

*Note that some networks have both minimum and maximum packet sizes. The* primitive fails if the maximum size is exceeded, and pads the packet up to the minimum size if necessary.

Note that for sending packets, the number of bytes of data is an argument to the primitive, whereas for receiving packets it appears in the packet buffer."

primitiveReceiveInto: aByteArray signal: aSemaphore
"Code omitted - hardware specific. This method should be implemented as a primitive.

Sets up the controller to receive a packet. When the next input packet arrives this routine copies the packet into the byte array and signals the semaphore. The first two bytes (i.e. byteArray wordAt: 1) will contain the number of bytes of data received, followed by the data.

The primitive fails if the byteArray is not a byte-type object.

Note that if the primitive has internal packet buffers, the semaphore may be signalled immediately.

Any packet too big to fit in the buffer will be discarded.

There are several possible ways to implement this primitive. If the machine has a DMA-type controller, the most efficient implementation is to lock down the packet buffer in memory (in a virtual memory system) and let the controller write the packet into it directly. If the controller buffers packets internally, an alternate implementation which does not interact with the virtual memory system is to copy the packet into the buffer at the time that the Smalltalk scheduler polls the I/O system for outstanding semaphore signals.

This primitive only receives one packet. It must be called again for each packet. Of course the primitive may have internal buffers for more than one packet."

RetransmitSocket class

*This class implements a fairly reliable retransmit-if-necessary ethernet communication scheme. The entire class is presented here.*

---

Object subclass: #RetransmitSocket
    instanceVariableNames: 'localPort foreignPort receivePackets inputPacketQ replyTimeout maxTransmissions.'
    classVariableNames: ''
    poolDictionaries: ''
    category: 'Ethernet-Kernel' initialize
    receivePackets ← false.
    inputPacketQ ← SharedQueue new: 10.
    replyTimeout ← 300.
    maxTransmissions ← 5.

localPort
    ↑ localPort localPort: pupAddress
    localPort ← pupAddress foreignPort: pupAddress
    foreignPort ← pupAddress receivePacket: aPup
    receivePackets
        ifTrue:
            [(inputPacketQ nextPut: pup) ].

maxTransmissions: anInteger
    maxTransmissions ← anInteger startReceiving
    *"Start queueing incoming packets."*
    receivePackets ← true open
    *"Install this socket so Ether packets will be received."* inputPacketQ ← SharedQueue new: 10.
    self startReceiving.
    TheNetwork addSocket: self.

close
    *"Close this socket so no more packets will be received. Also disable timers and remove circular structures, etc."*
    TheNetwork removeSocketNumber: localPort socket.
    inputPacketQ release.
    super release.

addressAndSendPacket: etherPacket etherPacket sourcePort: localPort.
etherPacket destinationPort: foreignPort.
TheNetwork sendPacket: etherPacket.

addressAndWaitForReply: etherPacket suchThat: testBlock
*"Transmit this Pup on the Ethernet and wait for a reply for which testBlock evaluates to true, retransmitting if necessary. Answer whether any replies came."*

```
| transmitOn count result |
etherPacket sourcePort: localPort.
etherPacket destinationPort: foreignPort.
inputPacketQ ← SharedQueue new: 10          "initialize input Q"
receivePackets ← true.            "start queueing input packets"
count ← 0.                "initialize transmit count and flag"
transmitOn ← true.
"fork a transmitting process"
    [   [transmitOn and: [(count ← count + 1) < = maxTransmissions]]
whileTrue:
            [TheNetwork sendPacket: etherPacket.
            (Delay forMilliseconds: replyTimeout) wait].
        transmitOn
            ifTrue: [inputPacketQ nextPut: nil]. "signals timeout, give up"
    ] fork.
result ← self nextPacketSuchThat: filterBlock.       "wait for first response"
transmitOn ← false.         "stop transmitting"
receivePackets ← false.     "stop queueing input packets"
result isNil ifTrue:        "..it was a timeout"
    [ ↑ false].
↑ true "..it was at least one response"
``` nextPacketSuchThat: filterBlock
*"Answer the next input Pup for which filterBlock evaluates to true, or nil if a timeout has been signaled."*

```
| pup |
[(pup ← inputPacketQ next) isNil or: [filterBlock value: pup]] whileFalse.
↑ pup
```

RetransmitSocket class methods fromSocket: localSocketNumber to: foreignPort
*"Create a new socket which will listen to localSocketNumber and send to foreignPort. Start the socket listening."*

```
| pupSocket |
pupSocket ← super new.
pupSocket localPort:
    (PupAddress
        net: TheNetwork localNetNumber
        host: TheNetwork localHostNumber
        socket: localSocketNumber).
pupSocket foreignPort: (foreignPort copy).
↑ pupSocket open  "put into the socket table"
```

Class Pup

*A Pup (for "PARC Universal Packet") represents a kind of network packet object. It is not necessary for the implementor to duplicate the exact form of Pups: any network packet format will do. All that is necessary is to provide the correct methos as described below:*

---

*Class Pup may be implemented as a subclass of class Object, or as a subclass of some Collection class like ByteArray.*

Class Pup methods:

pupType
 "*Code omitted -- depends on packet format.*
 *Return a byte of data from a reserved location in the packet that represents the type of the packet. There is no meaning associated with the type field by the network or transmission sockets. To them, it is just a number. The Shared ARK system uses the type as being 0 or 42 to indicate different kinds of information.*"

type: aNumber
 "*Code omitted -- depends on packet format.*
 *Set the value of the pupType field to the indicated number.*"

sourcePort
 "*Code omitted -- depends on packet format.*
 *Return the value of the fields in this Pup that represent the sending network address. Use the method PupAddress net: host: socket: to create and return a PupAddress object.*"

sourcePort: aPupAddress
 "*Code omitted -- depends on packet format.*
 *set the bytes that represent the sending socket address.*"

destinationPort
 "*Code omitted -- depends on packet format.*
 *Answer a PupAddress representing the destination process. Use an instance of PupAddress as above.*"

destinationPort: aPupAddress
 "*Code omitted -- depends on packet format.*
 *set the bytes that represent the receiving socket address.*"

dataWordAt: wordIndex
 "*Code omitted -- depends on packet format.*
 *Answer the 16-bit Integer in the Pup contents at this word index.*"

dataWordAt: wordIndex put: dataWord
 "*Code omitted -- depends on packet format.*
 *Set the 16-bit Integer in the Pup contents at this word index.*"

asByteArray
 "*Code omitted -- depends on packet format.*
 *Convert the contents of the Pup into a byteArray, and return the byteArray. The byte array contains all the information in the up, including the sender and receiver* addresses. This is in a sense the inverse of the next method."

Pup class methods newFromByteArray: aByteArray
"Code omitted -- depends on packet format.
Return a new Pup based on the information in the byteArray. The byteArray contains all the pup fields, including the sender and receiver addresses. The first two bytes give the size of the packet. This is in a sense the inverse of the previous method."

Class PupAddress

*Instance Variables:*
   net   <Integer> [0..255] identifies the Ethernet Number.
   host  <Integer> [0..255] identifies the host on the given Ethernet.
   socket<Integer> [0..2 ↑ 32) identifies the process on the given host.

*The complete definition of this class is provided here:*
--------------------------

Object subclass: #PupAddress
   instanceVariableNames: 'net host socket '
   classVariableNames: ' '
   poolDictionaries: ' '
   category: 'Ethernet-Kernel'

PupAddress methods:

host
   *"Answer the host number"*
   ↑ host host: newHost
   *"Set the host number"*
   host ← newHost net
   *"Answer the network number"*
   ↑ net net: newNet
   *"Set the network number"*
   net ← newNet socket
   *"Answer the socket number"*
   ↑ socket socket: newSocket
   *"Set the socket number"*
   socket ← newSocket
= address
   *"Return true if all my three fields are = to those of address"*
   ↑ self species = address species and:
      [net = address net and: [host = address host and: [socket = address socket]]]

hash
   *"Return a value which will be the same for all = instances of me"*
   ↑ (net bitXor: host) bitXor: (socket bitAnd: 8r177777)

printOn: stream net printOn: stream radix: 8.
   stream nextPut: $#.
   host printOn: stream radix: 8.
   stream nextPut: $#.
   socket printOn: stream radix: 8.

PupAddress class methods net: netNumber host: hostNumber socket: socketNumber
   *"Create a PupAddress with this net, host and socket number."*
   ↑ self basicNew net: netNumber; host: hostNumber; socket: socketNumber

What is claimed:

1. A method comprising:
presenting a shared workspace at each of first and second workstations, the shared workspace being perceptible as including a region, the region being perceptible as having a position within the shared workspace; the region having a first level of privacy applicable to the first workstation and a second level of privacy applicable to the second workstation;
the step of presenting the shared workspace comprising:
presenting first and second display objects within the shared workspace, the first display object indicating a position of the region within the workspace, the region being presented at the first workstation with the first level of privacy and at the second workstation with the second level of privacy;
receiving a signal from the first workstation requesting that the first display object be positioned on the second display object; and
in response to the signal, presenting the shared workspace with the first display object superimposed on the second display object such that at least part of the second display object is in the region, the part of the second display object that is in the region being presented at the first workstation with the first level of privacy and at the second workstation with the second level of privacy.

2. The method of claim 1 in which the step of presenting the shared workspace further comprises:
after the substep of presenting the shared workspace with the first display object superimposed on the second display object in response to the first abovementioned signal, receiving a second signal from one of the first and second workstations requesting movement of the second display object to a new position within the shared workspace; and in response to the second signal, presenting the shared workspace with the first display object superimposed on the second display object at the new position such that at least part of the second display object remains in the region.

3. A method of presenting a navigable shared workspace at each of first and second workstations, the method comprising:
receiving, at the first workstation, a first signal indicating a first part of the shared workspace to be presented at the first workstation;
receiving, at the second workstation, a second signal indicating a second part of the shared workspace to be presented at the second workstation; the first part and the second part each including a region within the shared workspace; and in response to the first and second signals, presenting the first part of the shared workspace at the first workstation and presenting the second part of the shared workspace at the second workstation; the first part of the shared workspace presented at the first workstation having a first set of display features in the region and the second part of the shared workspace presented at the second workstation having a second set of display features in the region, the first set of display features being different than the second set of display features;

the step of receiving the first signal comprising receiving a signal selecting a selectable transition unit in a third part of the shared workspace presented at the first workstation, the step of presenting the first and second parts of the shared workspace comprising ceasing to present the third part of the shared workspace at the first workstation and beginning to present the first part of the shared workspace at the first workstation.

4. A method comprising:

presenting a shared workspace at first and second workstations; the shared workspace including a pointer; the shared workspace further including a private region with a boundary, the private region having a level of privacy applicable to the first workstation, the level of privacy indicating whether the first workstation has sufficient access to the private region to move the pointer into the private region;

the step of presenting the shared workspace comprising:

presenting the shared workspace with the pointer outside the boundary of the private region and, if the level of privacy indicates that the first workstation has sufficient access to move the pointer into the private region, presenting a key display object within the shared workspace at the first workstation;

receiving a signal from the first workstation requesting movement of the pointer into the private region; and responding to the signal based on the level of privacy of the private region; the substep of responding to the signal comprising presenting the pointer in the private region if the signal also requests that the key display object move into the private region but continuing to present the pointer outside the private region's boundary if the signal does not also request that the key display object move into the private region.

5. A method comprising:

presenting a shared workspace at first and second workstations; the shared workspace including a pointer; the shared workspace further including a private region that contains a selectable display unit, the private region having a level of privacy applicable to the first workstation, the level of privacy indicating whether the first workstation has sufficient access to the private region to select the selectable display unit;

the step of presenting the shared workspace comprising:

presenting the shared workspace with the pointer and the private region containing the selectable display unit;

receiving a signal from the first workstation requesting positioning of the pointer on the selectable display unit and selection of the selectable display unit; and responding to the signal based on the level of privacy of the private region; the substep of responding to the signal comprising selecting the selectable display unit if the level of privacy indicates that the first workstation has sufficient access to select the selectable display unit and not selecting the selectable display unit if the level of privacy indicates that the first workstation does not have sufficient access.

6. A method comprising:

presenting a shared workspace at each of first and second workstations;

the step of presenting the shared workspace comprising:

presenting the shared workspace including first and second display objects within the shared workspace, the first display object indicating a position of a region within the workspace;

receiving a signal from the first workstation requesting that the first display object be positioned on the second display object such that the second display object is entirely within the region; and in response to the signal, presenting the shared workspace with the first display object superimposed on the second display object such that the second display object is entirely in the region.

7. A method comprising:

presenting a shared workspace at each of first and second workstations;

the step of presenting the shared workspace comprising:

presenting the shared workspace with first and second display objects within the shared workspace, the first display object indicating a position of a region within the workspace;

receiving a signal from the first workstation requesting that the first display object be positioned on the second display object such that only a part of the second display object is in the region; and is response to the signal, presenting the shared workspace with the first display object superimposed on the second display object within the shared workspace such that only the part of the second display object is in the region.

8. A method comprising:

presenting a shared workspace at each of first and second workstations;

the step of presenting the shared workspace comprising:

presenting first, second, and third display objects within the shared workspace, the first and third display objects respectively indicating opposite corners of a rectangular region within the workspace;

receiving a first signal from the first workstation requesting that the first display object be positioned on the second display object;

in response to the first signal, presenting the shared workspace with the first display object superimposed on the second display object such that at least part of the second display object is in the region;

receiving a second signal from the first workstation requesting that the third display object be positioned on the second display object; and in response to the second signal, presenting the shared workspace with the third display object superimposed on the second display object such that at least part of the second display object remains in the region.

9. A method of operating a system including a first workstation with a first display means, and a second workstation with a second display means; the system further including means for presenting a shared workspace on the first and second display means, presentation of the shared workspace producing the perception that a first workspace shown on the first display means is the same as a second workspace shown on the second display means; the shared workspace further being perceptible as including a region; the method comprising the steps of:

presenting the first workspace at the first display means, the first workspace including the region, the region being perceptible as having a position within the shared workspace and having a boundary that is within the shared workspace, the first workspace including a first set of display features within the boundary of the region; and presenting the second workspace at the second display means, the second workspace including the region, the region being perceptible as having a position within the shared workspace and having a boundary that is within the shared workspace, the second workspace including a second set of display features within the boundary of the region, the second set of display features appearing the same as the first set of display features;

receiving a first signal from the first workstation indicating a change in level of privacy of the region; and in response to the first signal, modifying one of the first and second sets of display features to appear differently than the other so that the region has a first level of privacy in the first workspace and a second level of privacy in the second workspace, the first and second levels of privacy being different.

10. The method of claim 9 in which the step of presenting the first workspace at the first display means comprises a substep of presenting contents of the region, the first set of display features including the presented contents of the region; the step of presenting the second workspace at the second display means comprising a substep of presenting display features that do not indicate the contents of the region, the second set of display features being the display features that do not indicate the contents of the region.

11. The method of claim 4 in which the contents of the region include at least one physical display object, the substep of presenting contents of the region comprising a substep of presenting the physical display object.

12. The method of claim 9 further comprising, after the step of modifying one of the first and second sets of display features, steps of:

receiving a second signal from the first workstation requesting a change in the position of the region; and presenting the region at a changed position in response to the request.

13. The method of claim 9 in which the first abovementioned region is further perceptible as including a second region, the second region being perceptible as having a position within the shared workspace and having a boundary that is within the boundary of the first region; the first set of display features including a third set of display features within the boundary of the second region; the second set of display features including a fourth set of display features within the boundary of the second region;

the step of modifying one of the first and second sets of display features further comprising a substep of respectively modifying one of the third and fourth sets of display features, so that the second region has the first level of privacy in the first workspace and the second level of privacy in the second workspace.

14. A method of operating a system including a first workstation with a first display means, and a second workstation with a second display means; the system further including means for presenting a shared workspace on the first and second display means, presentation of the shared workspace producing the perception that a first workspace shown on the first display means is the same as a second workspace shown on the second display means, the shared workspace further being perceptible as including a region; the method comprising the steps of:

presenting the first workspace at the first display means, the first workspace including the region, the region being perceptible as having a position within the shared workspace and having a boundary that is within the shared workspace;

presenting the second workspace at the second display means, the second workspace including the region, the region being perceptible as having a position within the shared workspace and having a boundary that is within the shared workspace;

receiving a first signal from the first workstation requesting that the region within the shared workspace be made private;

in response to the first signal, storing privacy data indicating that the level of privacy of the region at the first workstation is different than the level of privacy at the second workstation;

after the step of storing privacy data, receiving a second signal from the first workstation requesting an operation involving the region; and responding to the second signal based on the privacy data.

15. The method of claim 14 in which the privacy data indicates whether the first workstation has sufficient access to the region to perform the operation requested by the second signal; the step of responding to the second signal comprising a substep of performing the operation requested by the second signal if the privacy data indicates that the first workstation has sufficient access to the region to perform the operation requested by the second signal.

16. The method of claim 14 in which the first and second workspaces include respective first and second display objects within the region; the privacy data including data indicating that the first display object has a first level of privacy in the first workspace and the second display object has a second level of privacy in the second workspace.

17. The method of claim 15 in which the step of responding to the second signal further comprises a substep of denying the request if the privacy data indicates that the first workstation does not have sufficient access to the region to perform the operation requested by the second signal.

18. The method of claim 17 in which the substep of denying the request comprises a substep of performing a recovery operation other than the operation requested by the second signal.

19. A method of operating a system including a first workstation with a first display means, and a second workstation with a second display means; the system further including means for presenting a shared workspace on the first and second display means, presentation of the shared workspace producing the perception that a first workspace shown on the first display means is the same as a second workspace shown on the second display means, the shared workspace further being perceptible as including a region; the method comprising the steps of:
- presenting the first workspace at the first display means, the first workspace including the region, the region being perceptible as having a position within the shared workspace and having a boundary that is within the shared workspace, the first workspace further including a display object within the region, the display object including a selectable unit that a user can select to request that the region be made private;
- presenting the second workspace at the second display means, the second workspace including the region, the region being perceptible as having a position within the shared workspace and having a boundary that is within the shared workspace;
- receiving a signal from the first workstation indicating user selection of the selectable unit;
- in response to the signal, storing privacy data indicating that the region has a first level of privacy in the first workspace and a second level of privacy in the second workspace, the first and second levels of privacy being different.

20. The method of claim 19 in which the first above-mentioned region is further perceptible as including a second region within the first region; the privacy data further indicating that the second region has the first level of privacy in the first workspace and the second level of privacy in the second workspace; the method further comprising:
- after the step of storing privacy data, receiving a second signal from the first workstation requesting an operation involving the second region; and
- responding to the second signal based on the privacy data.

21. A method of operating a system including a first workstation with a first display means, and a second workstation with a second display means; the system further including means for presenting a shared workspace on the first and second display means; presentation of the shared workspace producing the perception that a first workspace shown on the first display means is the same as a second workspace shown on the second display means, the shared workspace further including a pointer, the shared workspace further being perceptible as including a region; the method comprising the steps of:
- presenting the first workspace at the first display means, the first workspace including the region, the region being perceptible as having a position within the shared workspace and having a boundary that is within the shared workspace, the pointer being outside the region and visible in the first workspace;
- presenting the second workspace at the second display means, the second workspace including the region, the region being perceptible as having a position within the shared workspace and having a boundary that is within the shared workspace, the pointer being outside the region;
- receiving a first signal from the first workstation requesting that the region within the shared workspace be made private;
- in response to the first signal, storing privacy data indicating the region has a first level of privacy in the first workspace and a second level of privacy in the second workspace, the first and second levels of privacy being different, so that the first workstation has sufficient access to move the pointer into the region, and the second workstation does not have sufficient access to move the pointer into the region;
- receiving a second signal from the first workstation requesting movement of the pointer into the region; and
- responding to the second signal based on the stored data indicating the level of privacy of the region.

22. The method of claim 21 in which the step of responding to the second signal comprises presenting the pointer in the region so that it is visible in the first workspace and not visible in the second workspace.

23. A method of operating a system including a first workstation with a first display means, and a second workstation with a second display means; the system further including means for presenting a navigable shared workspace on the first and second display means; presentation of the shared workspace producing the perception that a first workspace shown on the first display means is the same as a second workspace shown on the second display means, the shared workspace further being perceptible as including a region; the shared workspace further including a selectable transition unit for requesting transition to the region; the method comprising the steps of:
- presenting the first workspace at the first display means, the first workspace including the selectable transition unit;
- presenting the second workspace at the second display means, the second workspace including the region, the region being perceptible as having a position within the shared workspace and having a boundary that is within the shared workspace;
- storing privacy data indicating that the region has a level of privacy so that the first workstation has sufficient access to make a transition to the region;
- receiving a first signal from the first workstation indicating user selection of the selectable transition unit to request transition to the region;
- responding to the first signal based on the privacy data by making a transition to the region so that the first workspace includes the region, the region being perceptible as having a position within the shared workspace and having a boundary that is within the shared workspace.

* * * * *